(12) United States Patent
Botwick et al.

(10) Patent No.: US 12,294,557 B2
(45) Date of Patent: May 6, 2025

(54) SHARING OF COLLABORATIVE DOCUMENTS WITH USERS VIA INSTANT MESSAGING

(71) Applicant: Salesforce, Inc., San Francisco, CA (US)

(72) Inventors: Nate Botwick, San Francisco, CA (US); Anh Khuc, Millbrae, CA (US); Ben Cronin, Newton, MA (US); Matthew Chan, San Francisco, CA (US); Christopher Masterson, San Francisco, CA (US); David Engelberg, Seattle, WA (US); Diana Berlin, San Francisco, CA (US); Merwan Hade, San Francisco, CA (US); John Brock, Oakland, CA (US); Andrew Chung, Berkeley, CA (US); Justin Edmund, San Francisco, CA (US); Norris Lee, South San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/127,375

(22) Filed: Dec. 18, 2020

(65) Prior Publication Data

US 2022/0014486 A1 Jan. 13, 2022

Related U.S. Application Data

(60) Provisional application No. 63/050,556, filed on Jul. 10, 2020.

(51) Int. Cl.
*H04L 51/04* (2022.01)
*G06F 3/04817* (2022.01)
(Continued)

(52) U.S. Cl.
CPC .......... *H04L 51/04* (2013.01); *G06F 3/04817* (2013.01); *G06F 3/04886* (2013.01); *G06F 21/629* (2013.01); *G06Q 10/101* (2013.01)

(58) Field of Classification Search
CPC . H04L 51/04; G06F 3/04886; G06F 3/04817; G06Q 10/101; G06Q 10/107
See application file for complete search history.

(56) References Cited

U.S. PATENT DOCUMENTS 8,286,085 B1 * 10/2012 Denise ................. G06Q 10/107
715/752
10,866,926 B2 * 12/2020 Mertens .............. G06F 16/9032
(Continued)

FOREIGN PATENT DOCUMENTS

JP 2016-540325 A 12/2016
JP 2018-514025 A 5/2018
(Continued)

OTHER PUBLICATIONS

International Search Report and Written Opinion of the International Searching Authority directed to related International Patent Application No. PCT/US2021/015865, mailed Apr. 21, 2021; 11 pages.

(Continued)

*Primary Examiner* — Stephen S Hong
*Assistant Examiner* — Phoebe X Pan
(74) *Attorney, Agent, or Firm* — Sterne, Kessler, Goldstein & Fox P.L.L.C.

(57) ABSTRACT

Disclosed herein are system, method, and computer program product embodiments for sharing of collaborative documents with users via instant messaging. In one aspect, a collaborative application is configured to display one or more user interfaces associated with a collaborative application that allows a user to engage in a real-time chat (Continued)

between and among one or more users. The collaborative application may also present one or more user interfaces that allow the user to select one or more references of collaborative documents stored at a remote document datastore, and then share these references of collaborative documents with one or more users in the real-time chat. In one example, these references may be represented in real-time chat as a user interface element that visually present the collaborative document title and associated collaborative document pictogram or icon.

20 Claims, 14 Drawing Sheets

(51) Int. Cl.
*G06F 3/04886* (2022.01)
*G06F 21/62* (2013.01)
*G06Q 10/101* (2023.01)

(56) References Cited

U.S. PATENT DOCUMENTS

| | | | | |
|---|---|---|---|---|
| 10,866,929 B2* | 12/2020 | Watanabe | | G06F 3/04817 |
| 10,873,852 B1* | 12/2020 | Bernardi | | H04W 4/14 |
| 10,951,558 B2* | 3/2021 | Ferrick | | H04L 51/046 |
| 11,048,486 B2* | 6/2021 | Doyle | | G06F 40/14 |
| 2010/0123724 A1* | 5/2010 | Moore | | H04M 1/7243 |
| | | | | 345/173 |
| 2010/0153376 A1 | 6/2010 | Davidson | | |
| 2010/0275109 A1* | 10/2010 | Morrill | | G06F 40/274 |
| | | | | 715/261 |
| 2011/0161449 A1* | 6/2011 | Callanan | | H04L 51/046 |
| | | | | 709/206 |
| 2011/0276897 A1* | 11/2011 | Crevier | | H04L 61/4555 |
| | | | | 715/752 |
| 2011/0289404 A1* | 11/2011 | Fleur | | G06F 40/169 |
| | | | | 715/255 |
| 2011/0295879 A1* | 12/2011 | Logis | | G06F 16/9574 |
| | | | | 715/764 |
| 2012/0054655 A1* | 3/2012 | Kang | | H04M 1/7243 |
| | | | | 715/767 |
| 2012/0197980 A1* | 8/2012 | Terleski | | G06Q 50/01 |
| | | | | 709/203 |
| 2015/0302096 A1* | 10/2015 | Iwasaki | | G06F 16/90332 |
| | | | | 707/722 |
| 2016/0006856 A1 | 1/2016 | Bruno | | |
| 2016/0094499 A1* | 3/2016 | Uraizee | | H04L 51/08 |
| | | | | 715/752 |
| 2016/0330150 A1* | 11/2016 | Joe | | G06F 3/0486 |
| 2017/0060823 A1 | 3/2017 | Zheng et al. | | |
| 2017/0357443 A1* | 12/2017 | Paek | | G06F 3/0482 |
| 2017/0364866 A1 | 12/2017 | Steplyk et al. | | |
| 2018/0373724 A1* | 12/2018 | Novak | | G06F 16/338 |
| 2020/0012390 A1* | 1/2020 | Gurtin | | H04L 51/08 |
| 2020/0175185 A1* | 6/2020 | Dalal | | G06Q 10/10 |
| 2020/0274835 A1* | 8/2020 | McCue | | H04L 51/48 |
| 2020/0279070 A1* | 9/2020 | Rose | | G06F 40/106 |
| 2021/0173493 A1* | 6/2021 | Barzilay | | G06F 3/0482 |
| 2021/0200561 A1* | 7/2021 | Gurtin | | G06F 9/448 |

FOREIGN PATENT DOCUMENTS

| | | |
|---|---|---|
| JP | 2018-181295 A | 11/2018 |
| JP | 2019-514083 A | 5/2019 |

OTHER PUBLICATIONS

Corpuz John et al., "How to use WhatsApp: Tips, Tricks and More," Tom's Guide, Oct. 9, 2019; 8 pages; Downloaded Jul. 18, 2022; Available at: URL:https://www.tomsguide.com/us/picturesstory/528-whatsapp-how-to-user-guide.html.

Muller Ana: "Quip—Feature highlight: @mentions," Aug. 7, 2013, 4 pages; Downloaded Jul. 18, 2022; Available at: URL:https://quip.com/blog/mentions.

Anonymous, "WhatsApp now supports document sharing: Here's how to use," Technology News. The Indian Express, Mar. 6, 2016; 4 pages; Downloaded Jul. 18, 2022; Available at: URL:https://indianexpress.com/article/technology/mobile-tabs/whatsapp-document-share-option-how-to-use/.

Anonymous, "Mention (blogging)—Wikipedia" May 13, 2020; 3 pages; Downloaded Jul. 18, 2022; Available at: URL:https://en.wikipedia.org/w/index.php?title=Mention(blogging)&oldid=956517993.

Japanese Notice of Reasons for Refusal directed to Japanese Patent Application No. 2023-501041, mailed Jan. 14, 2025; 12 pages.

* cited by examiner

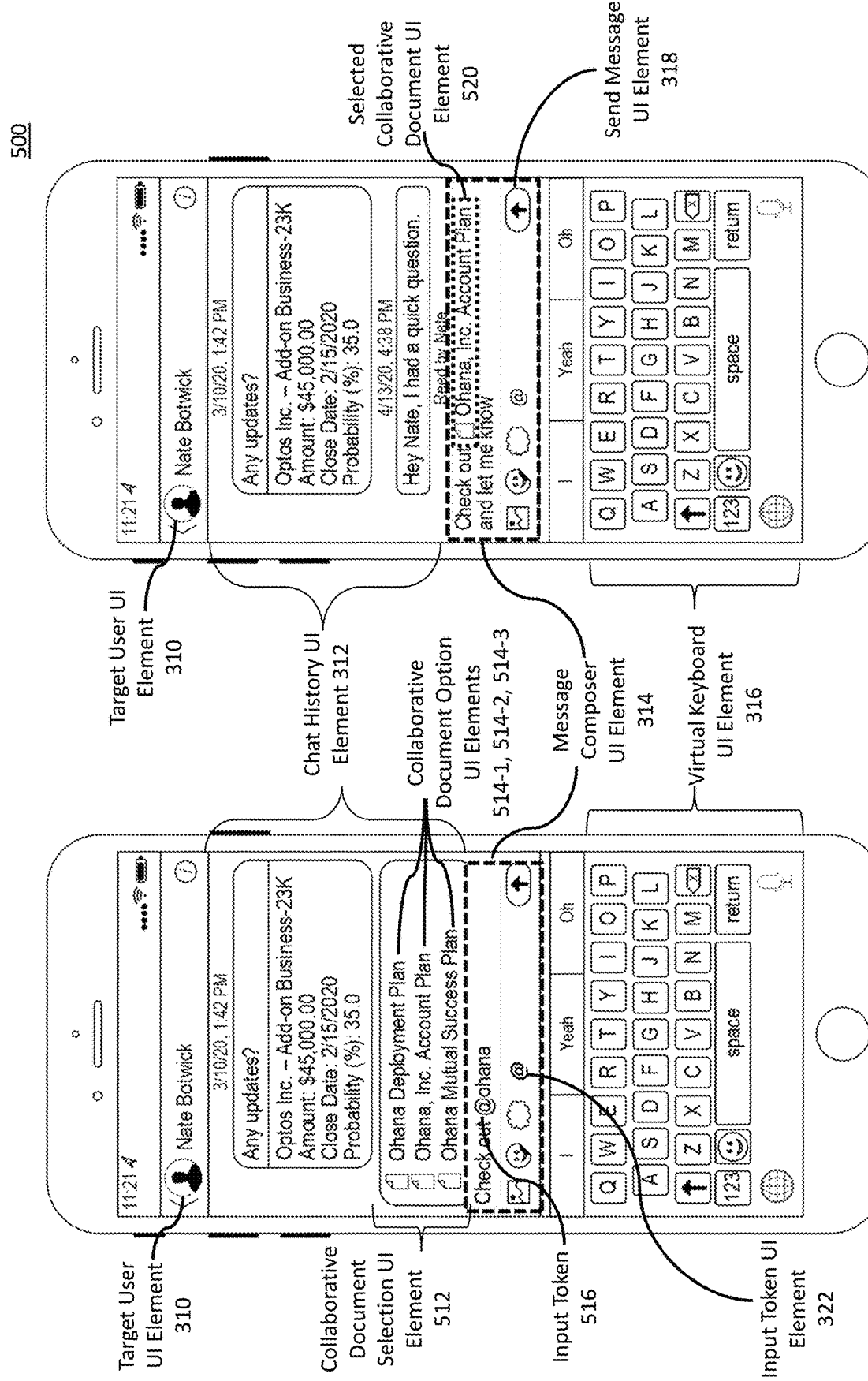

SHARING OF COLLABORATIVE DOCUMENTS WITH USERS VIA INSTANT MESSAGING

CROSS REFERENCE TO RELATED APPLICATION

This application claims the benefit of priority to U.S. Provisional Patent Application No. 63/050,556 filed on Jul. 10, 2020 titled "SHARING OF COLLABORATIVE DOCUMENTS WITH USERS VIA INSTANT MESSAGING," which is incorporated herein by reference in its entirety.

BACKGROUND

Operation of businesses often requires collaboration of between various users via sharing of various electronic and/or cloud based projects, records, and documents. While existing collaboration systems may allow users to share or collaborate these projects, records, and/or documents via traditional electronic communications methods such as email, such traditional communications methods often hinder the typical quick-paced workflow. As such, an improvement is needed to allow users to easily share and collaborate various cloud-based projects, records, and/or documents in near real-time with persistence.

BRIEF DESCRIPTION OF THE DRAWINGS

The accompanying drawings are incorporated herein and form a part of the specification.

FIGS. 5A-5C illustrate example chat UI views of the mobile collaborative application on a mobile device having a display device for selecting and sending a reference to a collaborative document.

Figure 1:
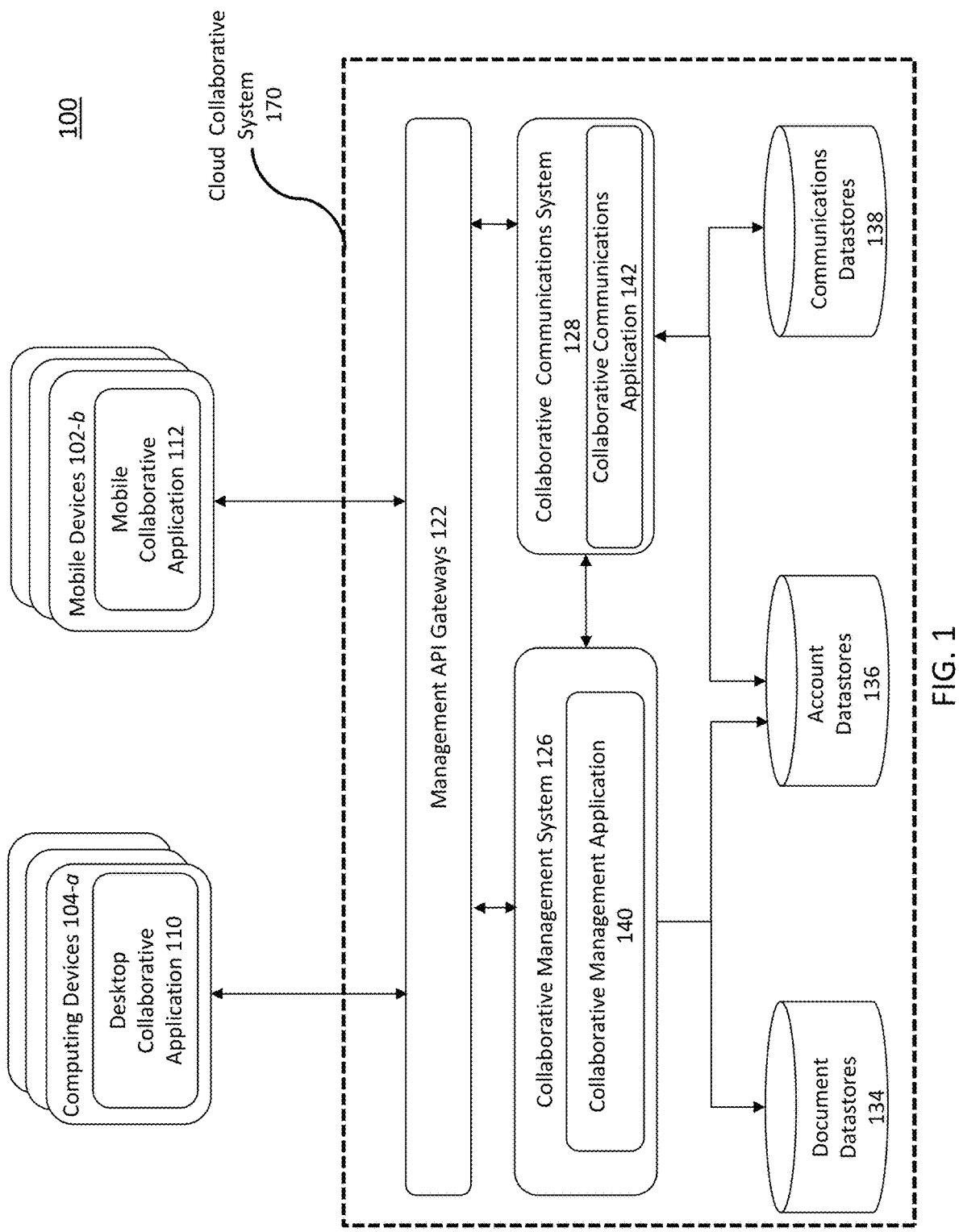
FIG. 1 illustrates an example embodiment of a system for sharing of collaborative documents with users via instant messaging.

In the drawings, like reference numbers generally indicate identical or similar elements. Additionally, generally, the left-most digit(s) of a reference number identifies the drawing in which the reference number first appears. Furthermore, one or more designators to the right of a reference number such as, for example, "a" and "b" and "c" and other similar designators are intended to be variables representing any positive integer. Thus, for example, if an implementation sets a value for a=4, then a set of elements 104-*a* may include elements 114-1, 114-2, 114-3, and 114-4.

DETAILED DESCRIPTION

Provided herein are system, apparatus, article of manufacture, method and/or computer program product embodiments, and/or combinations and sub-combinations thereof, for sharing of share various collaborative documents with one or more users via instant messaging.

Moreover, to provide a new, effortless, and seamless way to share and collaborate on one or more could-based collaborative documents, disclosed herein are various embodiments directed to sharing of collaborative documents between one or more users via instant messaging. Moreover, various embodiments provide a near effortless way to share collaborative documents and allow the one or more users to easily follow conversations surrounding the discussion of these collaborative documents. In this way, users can discuss and share various collaborative documents. Further features and advantages, as well as the structure and operation of various embodiments, are described in detail below with reference to the accompanying drawings.

FIG. 1 is a block diagram of system 100 for sharing of collaborative documents with users via instant messaging. System 100 may include one or more mobile devices 102-*b*, one or more computing devices 104-*a*, where the one or more mobile devices 102-*b*, one or more computing devices 104-*a* may be operatively and/or communicatively coupled to a cloud collaborative system 170. For example, the one or more computing devices 104-*a*, the one or more mobile devices 102-*b*, and/or the cloud collaborative system 170 of the system 100 may all be communicatively and/or operatively coupled together via wired connections, wireless connections, or a combination of wired and wireless connections as part of one or more communications networks.

In one example embodiment, the one or more communications networks may include, without limitation, an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In one embodiment, the one or more computing devices 104-*a* may be generally configured to execute one or more applications, which may include, without limitation desktop collaborative application 110. For example, the one or more computing devices 104-*a* may be representative of desktop computing devices, server devices, virtual machines executing on desktop computing devices and/or server devices, and/or the like. An example implementation of a computing device 104-*a* is further illustrated and discussed with respect to FIG. 9.

In one embodiment, the one or more mobile devices 102-*b* may be generally configured to execute one or more mobile applications, which may include, without limitation mobile collaborative application 112. For example, the one or more mobile devices 102-*b* may be representative of mobile phones, personal digital assistants, tablet computing devices, portable media players, and/or the like. An example implementation of a mobile device 102-*b* is further illustrated and discussed with respect to FIG. 8.

In one embodiment, the desktop collaborative application 110 (e.g., a web browser, a native application, etc.) may be configured to visually present (or otherwise display) one or more user interface (UI) views on a display device operatively coupled to the respective computing device 110-*a*. The one or more UI views may be generally configured to allow a user of the desktop collaborative application 110 to create, modify, and/or edit one or more collaborative documents managed by the cloud collaborative system 170. Additionally, the one or more UI views may also be configured to allow a user to chat, in real-time, with other users via their respective computing devices 102-*a* and/or one or more mobile devices 102-*b* using one or more chat UI views as illustrated in at least FIGS. 4, and 6A-6C.

In one embodiment, the mobile collaborative application 112 (e.g., a mobile web browser, a native mobile application, etc.) configured to visually present (or otherwise display) one or more user interface (UI) views. The one or more UI views may be configured to allow a user of the mobile collaborative application 112 to create, modify, and/or edit one or more collaborative documents managed by the cloud collaborative system 170. Additionally, the one or more UI views may also be configured to allow a user to chat, in real-time, with other users via their respective computing devices 102-*a* and/or one or more mobile devices 102-*b* using one or more chat UI views as illustrated in at least FIGS. 3, and 5A-5C.

In one embodiment, the cloud collaborative system 170 may include, without limitation, a management application program interface (API) gateway 122, a collaborative management system 126, a collaborative communications system 128, document datastores 134, accounts datastores 136, and communications datastores 138. Additionally, the cloud collaborative system 170 may further include, without limitation, include records datastores (not shown). All these systems, gateways, and datastores may be communicatively and/or operatively coupled together via one or more wired connections, wireless connections, or a combination of wired and wireless connections as part of one or more communications networks as illustrated in FIG. 1.

In one embodiment, the collaborative management system 126 may be generally configured to provide one or more cloud-computing services. The one or more cloud-computing services may include, without limitation, Infrastructure as a Service (IaaS), Software as a Service (SaaS), Platform as a Service (PaaS), Storage as a Service (StaaS), Mobile "backend" as a service (MBaaS), Function as a Service (FaaS), and/or any other cloud computing services. In one embodiment, the one or more cloud-computing services may also be generally implemented by one or more virtual machines executing on one or more server devices as further discussed with respect to FIG. 9.

In one embodiment, the one or more cloud computing services of the collaborative management system 126 may be generally configured to execute one or more distributed applications, which may include, without limitation, collaborative management application 140. In one embodiment, the collaborative management application 140 may generally be configured to communicate and operate with desktop collaborative application 110 and mobile collaborative application 112 in order to provide real-time collaborative content.

In one embodiment, collaborative management application 140 may allow multiple users to collaborate together, in real-time or near real-time, to design, write, implement, edit, and finalize various forms of collaborative content such as, for example, one or more collaborative documents, projects, database records, and/or the like. The one or more collaborative documents may include, without limitation, word processor documents, spreadsheet documents, presentation documents source code documents, and/or the like. Example collaborative management application 140 may include, without limitation, GOOGLE DOCS, MICROSOFT OFFICE 365, SALESFORCE QUIP, SALESFORCE LIGHTNING with SALESFORCE RECORDS, SALESFORCE PROJECTS and/or the like.

For example, the collaborative management application 140 may be configured to receive one or more requests from the desktop collaborative application 110 and/or mobile collaborative application 112 to create and/or delete one or more collaborative documents stored in document datastores 134. Additionally, the collaborative management application 140 may also be configured to receive one or more requests from the desktop collaborative application 110 and/or mobile collaborative application 112 to modify, revise, edit, update, delete, at least a portion of the one or more collaborative documents. The examples are not limited in this context.

Similarly, the collaborative management application 140 may also be configured to receive one or more requests from the desktop collaborative application 110 and/or mobile collaborative application 112 to create and/or delete one or more projects and/or database records stored in records datastores (not shown). Additionally, the collaborative management application 140 may be further configured to receive one or more requests from the desktop collaborative application 110 and/or mobile collaborative application 112 to modify, revise, edit, update, delete, at least a portion of the one or more projects and/or database records. The examples are not limited in this context In one embodiment, the collaborative communications system 128 may be generally configured to provide one or more cloud-computing services similar to those discussed with respect to the collaborative management system 128. In one embodiment, the one or more cloud-computing services may also be generally implemented by one or more virtual machines executing on one or more server devices as further discussed with respect to FIG. 9.

In one embodiment, the one or more cloud computing services of the collaborative communications system 128 may be generally configured to execute one or more distributed applications, which may include, without limitation, collaborative communications application 142. In one embodiment, the collaborative communications application 142 may generally be configured to communicate and operate with desktop collaborative application 110 and mobile collaborative application 112 in order to provide real-time instant messaging as further discussed herein.

It can be appreciated that while collaborative management system 126 and collaborative communications system 128 are illustrated as separate systems, these two systems may be combined into a combined system. Moreover, the combined system may then be configured to provide one or more cloud-computing services and execute the one or more distributed applications including, without limitation, the collaborative management application 140 and collaborative communications application 142.

In one embodiment, the document datastores 134 may be generally configured to store one or more collaborative documents and collaborative document information associated with each of the one or more collaborative documents. In one embodiment, the collaborative document information for each collaborative document may include, without limitation collaborative document title identifying a title for a corresponding collaborative document, and/or collaborative document identifier that uniquely identifies a corresponding collaborative document.

In one embodiment, collaborative document information may further include, without limitation, collaborative document type identifying the type of the corresponding collaborative document (e.g., word processor document, spreadsheet documents, presentation documents, source code documents, etc.), collaborative document pictogram identifier that identifies a pictogram representative of corresponding collaborative document, collaborative document access control list that identifies one or more user identifiers that have access and associated access type (e.g., read, write, view, full control, etc.), and/or any other information that may be associated with a collaborative document.

Although not explicitly shown, it can be appreciated that the collaborative management application 140 may also be operatively coupled to records datastores. In one embodiment, the records datastores may be generally configured to store database records. For example, the dataset records may be sales account records. The sales account records may include the name of the sales account, potential sale value, past sale value, target close date, current client, past client, potential client, and/or the like.

In one embodiment, the account datastores 136 and may be generally configured to manage user account information associated with each user of the collaborative management system 126 and collaborative communications system 142. The user account information for each user may include, without limitation, user identifier (e.g., user's email, unique name, etc.), user full name (e.g., first name and last name, etc.), user password (e.g., a hashed and salted version of an alphanumeric text, etc.), user image (e.g., an image or reference to an time associated with the user), cached authorized collaborative document list identifying one or more collaborative documents the user may access, and/or any other information associated with a user.

In one embodiment, the cached authorized collaborative document list may generally include a list of authorized collaborative document that the user may access in accordance with each collaborative document access control list associated with each collaborative document as discussed herein. In one embodiment, the cached authorized collaborative document list may include, without limitation, a cached version of the collaborative document information (i.e., cached collaborative document information) for each collaborative document the user may have access as discussed herein. Additionally, cached collaborative document information may further include, without limitation, collaborative document access frequency identifying a number of times the collaborative document was accessed by the user and a time and date for each access.

It can be appreciated that for security purposes and in some embodiments, the cached collaborative document information may not include all information available or associated with the collaborative document. For example, cached collaborative document information may exclude collaborative document access control list. In other examples, cached collaborative document information may include collaborative document access control list so as to show which users may also have access to the collaborative document.

To ensure the cached collaborative document information within the cached authorized collaborative document list are up to date with respect to the underlying collaborative document information for each collaborative document, the collaborative management application 140 and/or collaborative communications application 142 may be configured to periodically (e.g., every hour, 12 hours, day, seven days, etc.) synchronize or update the cached collaborative document information within the cached authorized collaborative document list. Moreover, the collaborative management application 140 and/or collaborative communications application 142 may be configured to perform the synchronization or update for cached collaborative document information within the cached authorized collaborative document list of one or more users with the corresponding underlying collaborative document information for each collaborative document.

Additionally or alternatively, the collaborative management application 140 and/or collaborative communications application 142 may asynchronously synchronize or update cached collaborative document information within the cached authorized collaborative document list of one or more users with the corresponding underlying collaborative document information for each collaborative document. For example, the collaborative management application 140 and/or collaborative communications application 142 may update cached collaborative document information within the cached authorized collaborative document list of the one or more users, when the corresponding underlying collaborative document information for a particular collaborative document is also updated.

In one embodiment, the communications datastores 138 may be generally configured to store chat history information with respect to a chat (or instant message) history between one or more users. In one embodiment, the chat history may include information relating to all chat sessions and/or conversations between a set of users. In one embodiment, the chat history information for each chat history between a set of users may include, without limitation, chat users list that identifies the user identifier of users that are engaged in the instant message conversation, chat history identifier that uniquely identifies a chat history between the set of users, and/or collaborative communications messages list between the set of users.

In one embodiment, the collaborative communications messages list may include, without limitation, one or more collaborative communications messages between the set of users. Each of the one or more collaborative communications messages may include, without limitation, a set of communications message attribute and communications message content. In one embodiment, the set of communications message attributes may include, without limitation, communications message time attribute identifying a time the communications message was transmitted, communications message author attribute identifying a user in the set of users that sent the communications message, and/or any other communications message attributes. In one embodiment, communications message content may include, without limitation, alphanumeric text associated with the actual communications message stored in one or more text encodings and/or interpreted languages (e.g., hyper or subset thereof).

In one embodiment, the management API gateways 122 may be generally configured to provide one or more APIs to allow one or more applications (e.g., the collaborative management application 140, collaborative communications application 142, etc.) to communicate with the desktop collaborative application 110 and mobile collaborative application 112. For example, the management API gateways 122 may be configured to manage any incoming requests and provide corresponding responses between the one or more applications and the collaborative management system 126 and/or collaborative communications system 128 in accordance with one or more communication protocols.

Figure 2:
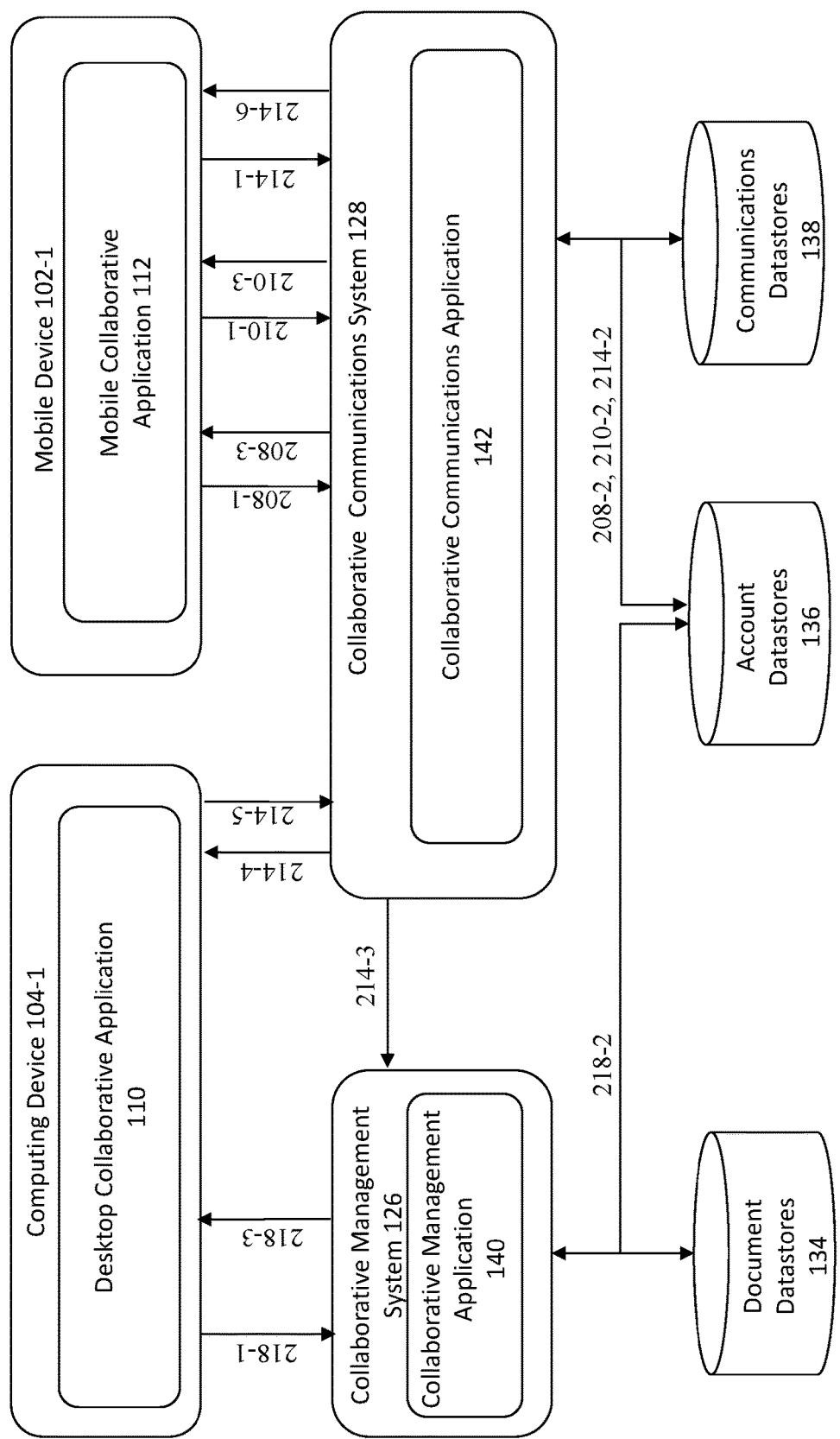
FIG. 2 illustrates example logic flows in the system for sharing a collaborative document using instant messaging.

FIG. 2 illustrates example logic flows 200 in system 100 for sharing a collaborative document collaborative communications system using instant messaging. It can be appreciated that depending on implementation, not all stages need to be performed. Nor do all stages need to be performed in the order as illustrated or otherwise discussed. Additionally, one or more stages may be combined with other disclosures as discussed herein (e.g., discussions of FIGS. 1, and 3-7).

In one embodiment, a first example logic flow may be generally directed to obtaining cached authorized collaborative document list associated with a user of the mobile collaborative application 112. Moreover, the first example logic flow may begin at stage 208-1, where the mobile collaborative application 112 of the mobile device 102-1 may generate and send an available collaborative document request to a collaborative communications system 128, in response to receiving input from a user of the mobile device 102-1 (e.g., a source user associated with mobile device 102-1). For example, the available collaborative document request may be generated and sent in response to receiving input from the user of the mobile device 102-1 requesting the mobile collaborative application 112 to initiate a chat session with another user (e.g., target user computing device 104-1).

Continuing with stage 208-1, in another example, the available collaborative document request may be generated and sent in response to receiving input from the user of the mobile device 102-1 to open the mobile collaborative application 112 (e.g., target user computing device 104-1). The collaborative document request may include, without limitation, a source user identifier, where the source user identifier may identify the user of the mobile device 102-1. In response, the collaborative communications application 142 may receive the available collaborative document request from the mobile device 102-1.

At stage 208-2, the collaborative communications application 142, may retrieve cached collaborative document information from the account datastores 136 for a user identified by the source user identifier. The collaborative communications application 142 may generate an available collaborative document response, where the available collaborative document response may include, without limitation, a cached authorized collaborative document list.

At stage 208-3, the collaborative communications application 142 may send the available collaborative document response to the mobile collaborative application 112. The mobile collaborative application 112 may then receive the available collaborative document response, which may then be cached by the mobile device 102-1 in memory (e.g., in device datastore 850 of memory 870). The mobile collaborative application 112 may then use the cached collaborative document information as further discussed in at least FIGS. 5A-5C.

In one embodiment, a second example logic flow may be generally directed to obtaining a chat history from a collaborative communications application 142 between a source user and at least one target user. Moreover, the second example logic flow may begin at stage 210-1, where mobile collaborative application 112 of the mobile device 102-1 may generate and send a chat history request to the collaborative communications application 142, in response to receiving input from a user of the mobile device 102-1 (e.g., a source user associated with mobile device 102-1). For example, the available collaborative document request may be sent in response to receiving input from the user of the mobile device 102-1 requesting the mobile collaborative application 112 to initiate a chat session with another user (e.g., target user computing device 104-1).

Continuing with stage 210-1, the chat history request may include, without limitation, a chat history identifier that identifies a chat history between the source user and at least one target user, a source user identifier that identifies the user of the device, and/or a target user identifier that identifies the recipient of messages sent by source user. In response, the collaborative communications application 142 may receive the available collaborative document request from the mobile device 102-1.

At stage 210-2, the collaborative communications application 142 may retrieve the chat history from the communications datastore 138, in response to the chat history request. Moreover, the collaborative communications application 142 may retrieve the chat history based at least on the chat history identifier, the source user identifier, and/or the target user identifier. The collaborative communications application 142 may generate a chat history response based at least on the chat history where the chat history response includes the chat history retrieved from the communications datastore 138.

Continuing with stage 210-2 the chat history may also include at least one collaborative document reference that identifies at least one collaborative document previously sent from the source user to the at least one target user and/or received by the source user and sent by at least one target user. Additionally, each collaborative document reference of the at least one collaborative document reference may include, without limitation, at least a collaborative document title, a collaborative document identifier, a collaborative document pictogram identifier, collaborative document type, and/or a collaborative document address identifying a Uniform Resource Locator (URL) and/or Uniform Resource Identifier (URI) for the collaborative document.

Continuing with stage 210-2 and optionally, the collaborative communications application 142 may also update the at least one collaborative document reference within the chat history between the source user and the at least one target user to be consistent with document datastores 134 managed by the collaborative management system 126.

For example, the collaborative communications application 142 may be configured to request at least a portion of the collaborative document information from the collaborative management application 140 for at least one collaborative document reference within the chat history. To reduce number of requests sent from the collaborative communications application 142, the request may be based at least on whether the underlying collaborative document information that correspond to the collaborative document reference within the chat history has been updated since the last time the collaborative document reference was updated in the chat history. Additionally or alternatively, the request may be based at least on whether at least a portion of the collaborative document reference (e.g., collaborative document title, etc.) is inconsistent or out of synchronization with the at least a portion of the collaborative document information (e.g., collaborative document title, etc.).

Continuing with the above example, the collaborative communications application 142 may then update the at least one collaborative document reference in the retrieved chat history and/or the chat history stored in the communications datastore 138. The update may be based at least on the received collaborative document information (or portions thereof) that corresponds to the at least one collaborative document reference within the chat history. In this way, one or more updates to at least a portion of collaborative document information (e.g., collaborative document title, etc.) for a particular collaborative document stored in the document datastores 134 may be reflected within the chat history regardless of when the collaborative document reference corresponding to the particular collaborative document was sent and/or received between the source user and the at least one target user.

At stage 210-3, the collaborative communications application 142 may transmit the chat history response to the mobile collaborative application 112 of the mobile device 102-1 The mobile collaborative application 112 may receive the chat history response, which may then be cached by the mobile device 102-1 in memory (e.g., in device datastore 850 of memory 870). The mobile collaborative application 112 may then use the chat history response as further discussed in at least FIGS. 5A-C.

In one embodiment, a third example logic flow may be generally directed to sending at least one collaborative communications message that include a collaborative document reference to at least one target user. Moreover, the third example logic flow may begin at stage 214-1, where the mobile collaborative application 112 of mobile device 102-1 may generate and send a message transmission request to the collaborative communications application 140. The message transmission request may include, without limitation, a chat history identifier, at least one target user identifier, and/or a source user identifier. Additionally, message transmission request may further include, without limitation, a collaborative communications message as further discussed in at least FIGS. 5A-5C and 6A-6C.

Continuing with stage 214-1, the collaborative communications message may include, without limitation, at least one collaborative document reference associated with a collaborative document. In response, the collaborative communications application 142 may receive message transmission request from the mobile device 102-1. Additionally, the mobile collaborative application 112 may also update a cached version of the chat history identified by the chat history identifier with the collaborative communications message.

At stage 214-2, the collaborative communications application 142 may identify a chat history stored in the communications datastore 138 based at least on the chat history identifier, the at least one target user identifier, and/or the source user identifier. The collaborative communications application 142 may then update the identified chat history with the collaborative communications message received from the mobile collaborative application 112 of mobile device 102-1.

At stage 214-3, the collaborative communications application 142 may send a document access request to the collaborative management application 140 to request access to the collaborative document for the target user. The document access request may include, without limitation, at least a portion of the collaborative document reference in the collaborative communications message, the at least one target user identifier, and/or the source user identifier. In response, the collaborative management application 140 may determine whether there is at least one target user who does not already have access to the collaborative document identified by the collaborative document reference. Additionally, the collaborative management application 140 may also determine whether the source user identified by the source user identifier also has access.

If the source user identified by its corresponding source user identifier has access to the collaborative document and there is at least one target user who does not already have access, the collaborative management application 140 may then grant the at least one target user, who do not already have access, access to the collaborative document. For example, to grant the at least one target user access, the collaborative management application 140 may add the at least one target user identifier of at least one target user who do not already have access to the collaborative document access control list for the collaborative document. Thus, any collaborative document references sent to the at least one target user can be automatically granted access to the underlying collaborative document.

At stage 214-4, the collaborative communications application 142 may send a message notification request to the desktop collaborative application 110 executing on computing device 104-1, where the desktop collaborative application 110 may be associated with a user identified by the target user identifier. In response, the desktop collaborative application 110 may receive the collaborative communications message and visually present (or otherwise display) the collaborative communications message in at least one chat UI view as further discussed in at least FIGS. 6A-6C.

At stage 214-5, the desktop collaborative application 110 executing on computing device 104-1 may send a message notification response indicating proper receipt of the collaborative communications message. In response, the collaborative communications application 142 may receive the message notification response from the desktop collaborative application 110.

At stage 214-6, the collaborative communications application 142 may send a message transmission response to the mobile collaborative application 112, where the message transmission response may include, without limitation, message notification status identifying whether the collaborative communications message was properly delivered to one or more one or users identified by the at least one target user identifier. In response, the mobile collaborative application 112 may also update the cached chat history to indicate that at least one user having the corresponding at least one target user identifier has successfully received the previously sent collaborative communications message.

Although not illustrated, it may be appreciated that at this stage, user of the desktop collaborative application 110 and the user of the mobile collaborative application 112 may request to open the collaborative document identified by the collaborative document reference that was received in a collaborative communications message. For example, the user of the mobile collaborative application 112 may select a collaborative document reference visually presented as one or more selectable UI elements on a touch sensitive display of their mobile device 102-1. In response to the selection, the mobile collaborative application 112 may then request the collaborative management system 126 to provide the collaborative document corresponding to the collaborative document reference to the mobile collaborative application 112. Alternatively, in response to the selection, the mobile collaborative application 112 may request an execution, launching, or opening of a separate mobile application (not shown) configured to manage (e.g., open, update, revise, modify, delete, etc.) collaborative documents stored in document datastores 134. The separate mobile application may then request the collaborative management system 126 to provide the collaborative document corresponding to the collaborative document reference back to the separate mobile application for management.

In one embodiment, a fourth example logic flow may be generally directed a target user that requesting to open a collaborative document that the target user received in a collaborative communications message having a collaborative document reference that corresponds to the collaborative document. The fourth example logic flow may begin at stage 218-1, where the collaborative communications application 142 may generate and send a collaborative document request to the collaborative management application 140 to access a collaborative document, in response to receiving input from a user of the desktop collaborative application 110 (e.g., a target user associated with computing device 104-1). For example, the collaborative document request may be generated and sent in response to receiving input from the user of the desktop collaborative application 110 requesting the desktop collaborative application 110 to open a collaborative document reference received in a collaborative communications message.

Continuing with stage 218-1, the collaborative document request may include, without limitation, the collaborative document reference. In response, the collaborative management application 140 may receive the collaborative document request.

At stage 218-2, the collaborative management application 140 may retrieve the corresponding collaborative document from the document datastores 134, based at least on the collaborative document reference.

At stage 218-3, the collaborative management application 140 may generate and send a collaborative document response to the desktop collaborative application 110, where the desktop collaborative application 110 may include, without limitation, the collaborative document. In response, the desktop collaborative application 110 may receive the collaborative document response, and visually present (or otherwise display) the collaborative document received in the collaborative document response. The user of the desktop collaborative application 110 may then may then send one or more requests to update, revise, modify, and/or delete at least a portion of the collaborative document via their mobile desktop collaborative application 110.

Figure 6A:
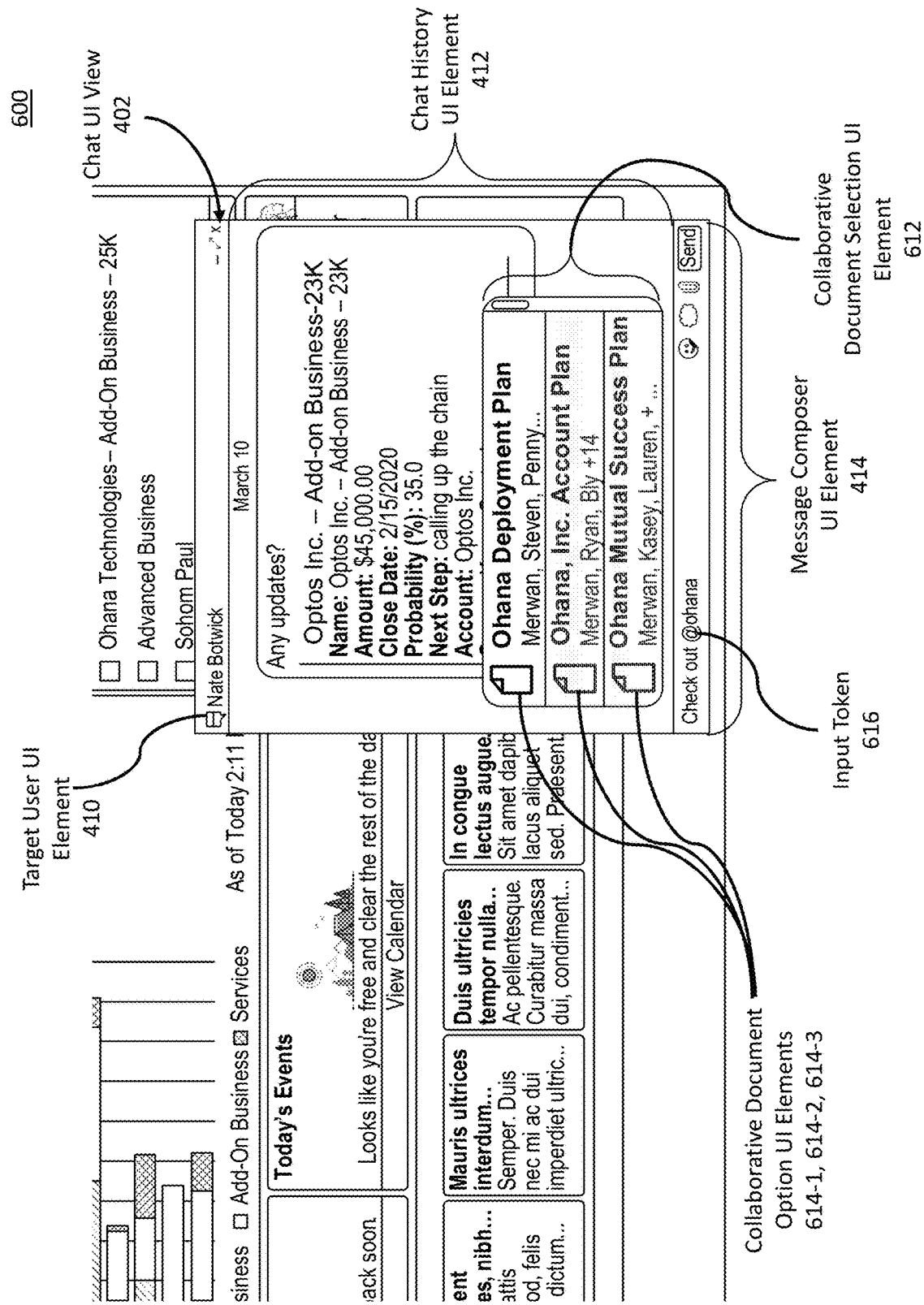
FIGS. 6A-6C illustrate example chat UI views of the desktop collaborative application on a computing device coupled to a display device for selecting and sending a reference to a collaborative document.
Figure 6B:
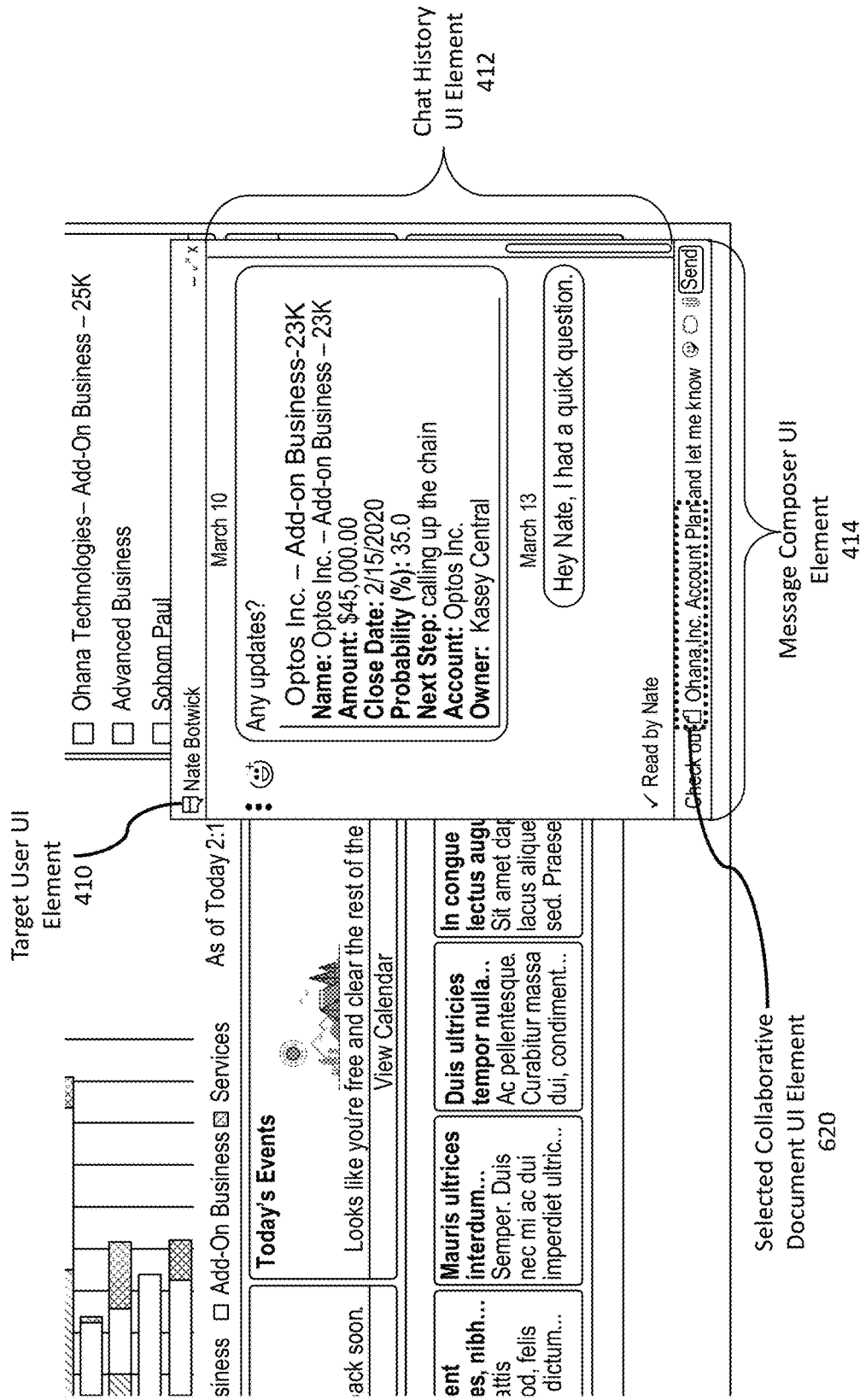
Figure 6C:
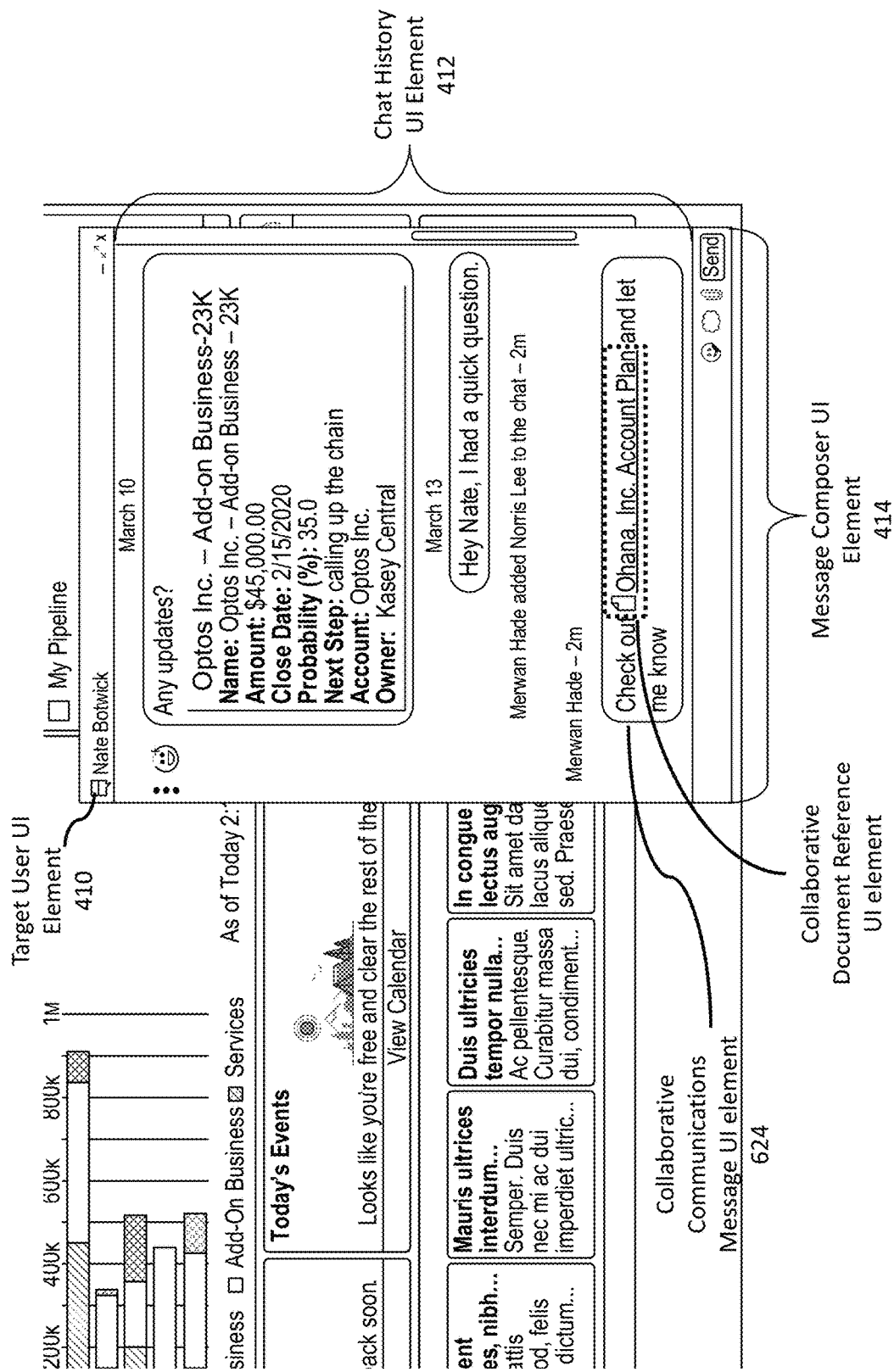

It can also be appreciated that while some of the above example logic flows (e.g., first example, second example, and third example logic flows) have been described between at least the mobile collaborative application 112 and the collaborative communications application 142, similar logic flows may be performed between the computing device 104-1 and the collaborative communications application 142 using similar chat UI views as illustrated in at least FIGS. 6A-6C. Similarly, while some of the above example logic flows (e.g., fourth example logic flow) have been described between computing device 104-1 and the collaborative management application 140, similar logic flows may be performed between the mobile collaborative application 112 and the collaborative communications application 142.

Additionally, it can be appreciated that in some instances, such as, for example, when the user of the mobile device 102-1 requests the mobile device 102-1 to execute mobile collaborative application 112 or to request the already executing mobile collaborative application 112 to send a collaborative communications message to at least one target user, stages 208-1, 208-2, and 208-3 may occur substantially contemporaneously with stages 210-1, 210-2, and 208-3.

Figure 3:
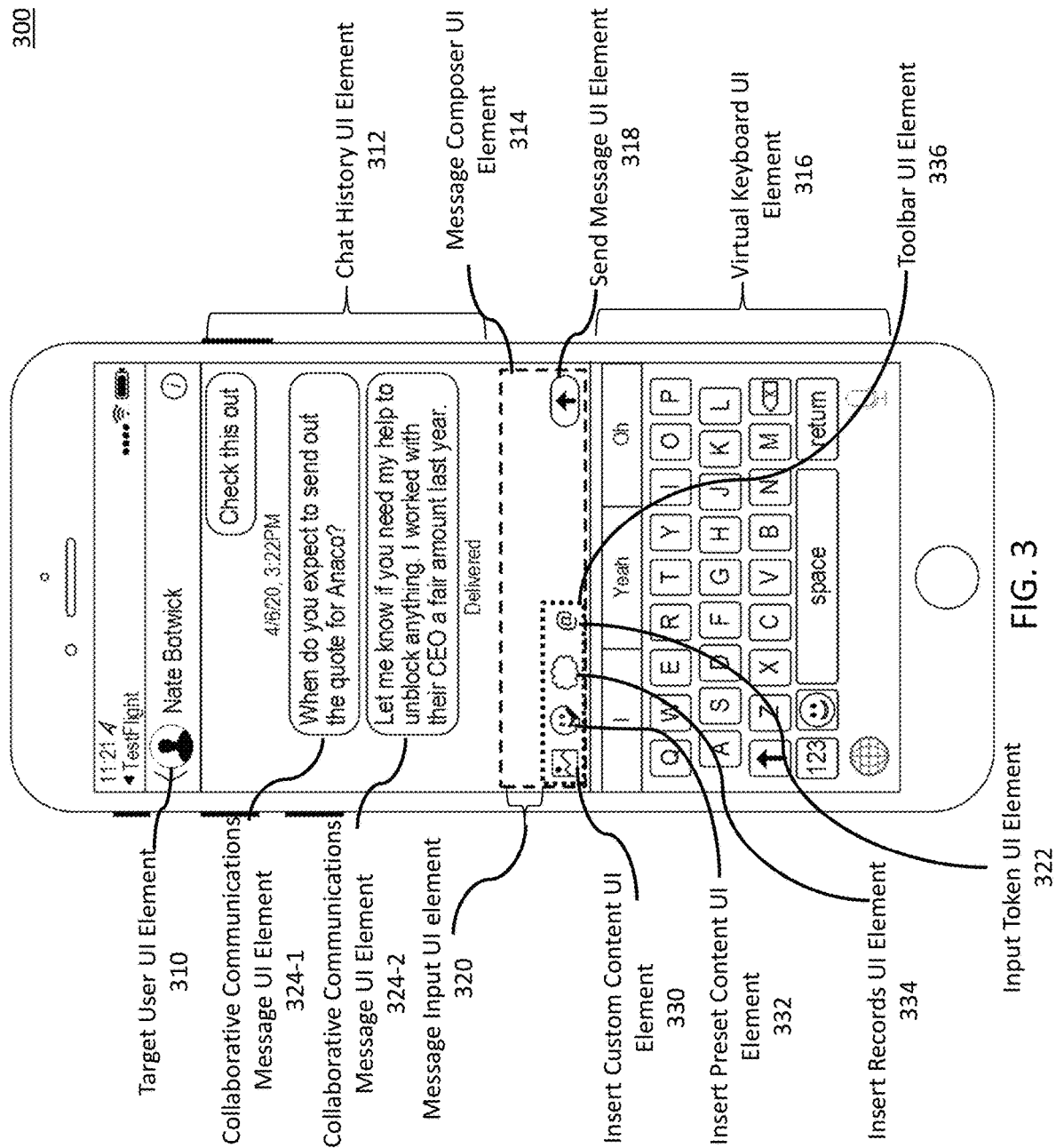
FIG. 3 illustrate an example chat User Interface (UI) view of a mobile collaborative application visually presented on a display device coupled to a mobile device for instant messaging and sharing of a collaborative document.

FIG. 3 illustrate an example chat UI view 300 of a mobile collaborative application 112 visually presented on a display device of a mobile device 102-1 for instant messaging and sharing of a collaborative document.

As illustrated in FIG. 3, the chat UI view 300 illustrates the chat user interface a user may use to engage in real time chat. In one embodiment, the chat UI view 300 may include a target user UI element 310 configured to visually present at least a portion of user account information associated with at least one target user, such as, for example, full name of the at least one target user and user image of the at least one target user.

In one embodiment, the chat UI view 300 may also include, without limitation, a chat history UI element 312 configured to visually present at least a portion of the chat history received from the collaborative communications application 142. Additionally or alternatively, the chat history UI element may be configured to visually present a cached version of the chat history (i.e., cached chat history) that was received from the collaborative communications application 142 locally stored on the mobile device 102-1.

In one embodiment, the chat history UI element 312 may include, without limitation, one or more collaborative communications message UI elements 324-c. Each collaborative communications message UI element (e.g., collaborative communications message UI element 324-1, 324-2) may correspond to a specific collaborative communications message in the chat history and may visually present the corresponding collaborative communications message.

In one embodiment, the chat history UI element 312 may visually present each of the one or more collaborative communications message UI elements 324-c in reverse chronological order. For example, collaborative communications messages that were sent earlier in time and date as identified by its corresponding communications message time attributes are displayed first. And thus, collaborative communications messages (e.g., collaborative communications messages corresponding to collaborative communications message UI element 324-1, 324-2) that were sent last in time and date as identified by its corresponding communications message time attributes are displayed last. In one embodiment, the chat history UI element 312 may also be further configured to be scrollable in order to allow a user to view the one or more collaborative communications message UI elements 324-c earlier or later in time and date.

In one embodiment, the chat UI view 300 may also include, without limitation, a message composer UI element 314. The message composer UI element 314 may be generally configured to visually present various user inputs (e.g., alphanumeric input, etc.) received from a user of mobile device 102-1. The various user inputs may form at least a portion of a collaborative communications message that may be generated and sent to a target user as identified by the target user UI element 310. Additionally, the message composer UI element 314 may also be configured to allow users to insert various collaborative content into a collaborative communications message.

In one embodiment, the chat UI view 300 may further also include, without limitation, the virtual keyboard UI element 316 generally configured to receive user input, such as, for example, haptic user input on a touch sensitive display device. Moreover, the virtual keyboard UI element 316 may include a plurality of selectable UI elements, where each of the one or more plurality of selectable UI elements corresponds to a particular alphanumeric input and/or modifications to the alphanumeric input.

In one embodiment, and to allow users to insert to insert various content into a collaborative communications message, the message composer UI element 314 may include, without limitation, a toolbar UI element 336. The tool bar UI element 336 may include one or more selectable UI elements that allow a user to insert various forms of content as further discussed herein.

In one embodiment, the toolbar UI element 336 may include, without limitation, an input token UI element 322. Moreover, the input token UI element 322 may be a selectable UI element to allow a user of the mobile device 102-1 to select one or more collaborative content for insertion into a collaborative communications message as discussed with respect to at least FIGS. 5A-5C.

In one embodiment, and to allow users to insert various non-alphanumeric text into a collaborative communications message, the toolbar UI element 336 may further include, without limitation, an insert custom content UI element 330 and an insert preset content UI element 332. In one embodiment, the insert custom content UI element 330 may be a selectable UI element that allows a user of the mobile device 102-1 to select and insert various types of content such as, for example, one or more images and/or video that are typically stored on the user's mobile device 102-1.

For example, after the user selects the insert custom content UI element 330, the mobile collaborative application 112 may be configured to provide one or more UI elements that allow a user to select various forms of custom content such as images and/or videos that are typically stored on the user's mobile device 102-1. The mobile collaborative application 112 may then send a selected custom content in a collaborative communications message to at least one target user via the collaborative communications system 128.

It is to be appreciated that unlike the transmission of various collaborative content as discussed herein, when selected custom content is transmitted, the actual underlying data (i.e., the actual image, the actual video, the actual file, etc.) of the selected custom content is transmitted from the user's device (e.g., mobile device 102-1) to a device of at least one target user. Thus, upon receipt by a target user's device (e.g., a computing device, mobile device, etc.) the target user may modify, edit, update, and/or delete the custom data without having to request access to the collaborative management application 140 using at least a portion of a collaborative document reference.

In one embodiment, the insert preset content UI element 332 may also be a selectable UI element to allow a user of the mobile device 102-1 to select and insert one or more references to a preset or predetermined content such as, for example, sets of static and/or animated images (e.g., animated GIFs, etc.), expressive pictograms (e.g., stickers, emoticons, etc.), and/or videos (e.g., MPEG videos, H.264/H.265 encoded videos, etc.) that are cached on the devices of various users (e.g., mobile device 102-1, computing device 104-1, etc.).

For example, after the user selects the insert preset content UI element 332, the mobile collaborative application 112 may visually present one or more of these predetermined set of static and/or animated visual content, which may include, without limitation, one or more images, expressive pictograms, and/or videos in one or more UI elements (not shown). A user may then search through the various visual content presented in one or more UI elements (not shown) and select one or more images, expressive pictograms, and/or videos to be sent to at least one target user. After receiving a user selection for at least one preset image, the mobile collaborative application 112 may then visually present, in the message input UI element 320, the actual or a reference to a selected preset content (e.g., static and/or animated image, expressive pictogram, and/or video, etc.) to be sent to the target user. The mobile collaborative application 112 may then send the selected reference to the preset content in a collaborative communications message to the at least one target user via the collaborative communications system 128. Depending on implementation, the collaborative communications message sent to the at least one target user may include a reference to the preset content and/or the actual underlying data for the preset content.

In one embodiment, and to allow users to search various database records stored in a records datastore 140 (not shown) operatively coupled to a collaborative management application 140, the toolbar UI element 336 may further include, without limitation, an insert records UI element 334. after the user selects the insert records UI element 334, the mobile collaborative application 112 may visually present one or more database records stored in a records datastore (not shown) as discussed herein. A user may then search for the one or more database records and select one or more database records to be sent to at least one target user. After receiving a user selection for at least one database record, the mobile collaborative application 112 may then visually present, in the message input UI element 320, a reference corresponding to the selected database record to be sent to the at least one target user. The mobile collaborative application 112 may then send the selected reference corresponding to the selected to at least one target user via the collaborative communications system 128.

In one embodiment, and to visually present the various user inputs (e.g., alphanumeric input, etc.) the user may provide via the virtual keyboard UI element 316, input token UI element 322, or other UI elements, the message composer UI element 314 may include, without limitation, a message input UI element 320. Moreover, the message input UI element 320 may be generally configured to visually present one or more alphanumeric characters that are input by a user of the mobile device 102-1 in real-time. Additionally, the message input UI element 320 may also be configured to visually present one or more selected collaborative document UI elements as further discussed with respect to at least FIGS. 5A-5C.

In one embodiment, and to send a collaborative communications message in a message transmission request, the message composer UI element 314 may further include a send message UI element 318. Moreover, the send message UI element 318 may be a selectable UI element to allow a user of the mobile device 102-1 to request the mobile device 102-1 to generate a message transmission request including the collaborative communications message, and send the message transmission request as discussed with respect to at least FIGS. 5A-5C.

Figure 4:
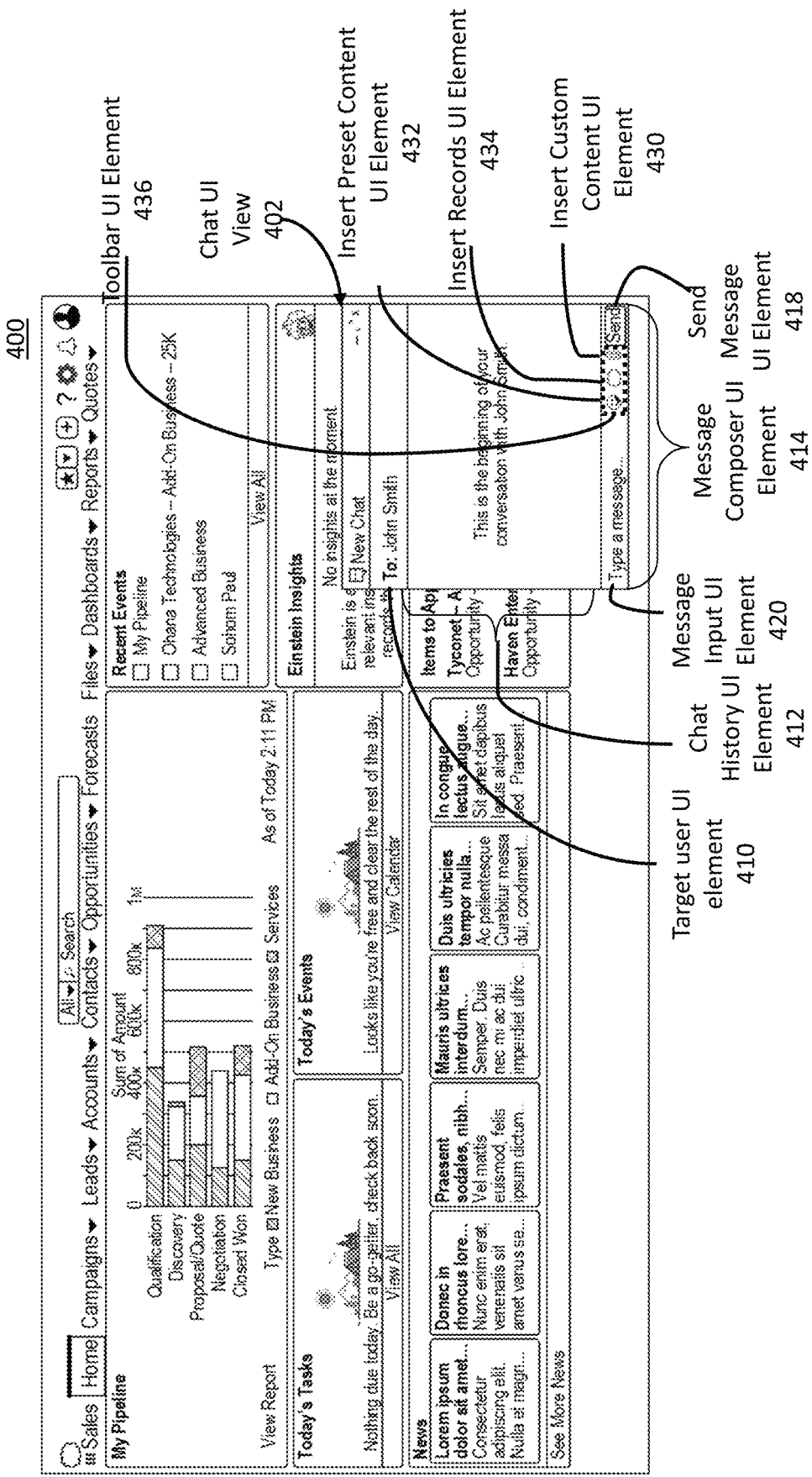
FIG. 4 illustrate an example chat User Interface (UI) view of desktop collaborative application on a computing device having a display device for instant messaging and sharing of a collaborative document.

FIG. 4 illustrate an example desktop collaborative application UI view 400 of a desktop collaborative application 110 visually presented on a display device coupled to a computing device 104-1 for at least instant messaging and sharing of a collaborative document. It can be appreciated that functionalities and operations associated with the desktop collaborative application 110 as discussed herein may be similar to the mobile collaborative application 112 as discussed in FIG. 3.

As illustrated in FIG. 4, desktop collaborative application UI view 400 may be configured to visually present a UI for accessing various types of collaborative content. In one embodiment, the desktop collaborative application UI view 400 may include a chat UI view 402. In one embodiment, the chat UI view 400 illustrates a chat UI a user may use to engage in real time chat with at least one target user.

In one embodiment, the chat UI view 402 may include, without limitation, a target user UI element 410, which may be similarly configured as target user UI element 310. For example, similar to target user UI element 310, the target user UI element 410 may also be configured to visually present at least a portion of user account information associated with at least one target user.

In one embodiment, the chat UI view 402 may also include, without limitation, a chat history UI element 412, which may be similarly configured as chat history UI element 412. For example, like chat history UI element 312, chat history UI element 412 may also be configured to visually present at least a portion of the chat history received from the collaborative communications application 142.

In one embodiment, the chat UI view 402 may further include, without limitation, a message composer UI element 414, which may be similarly configured as message composer UI element 314. For example, like the message composer UI element 314, the message composer UI element 414 may also be generally configured to visually present various user inputs (e.g., alphanumeric input, etc.) received from a user of computing device 104-1. The various user inputs may form at least a portion of a collaborative communications message that may be generated and sent to a target user as identified by the target user UI element 410. Additionally, the message composer UI element 414 may also be configured to allow users to insert various content (e.g., collaborative documents, database records, etc.) into a collaborative communications message via an input token (e.g., "@" etc.) as further discussed herein.

In one embodiment, the message composer UI element 414 may include, without limitation, a toolbar UI element 436. The tool bar UI element may include, without limitation, an insert custom content UI element 430, an insert preset content UI element 432, and an insert records UI element 434, which may be similarly configured as the insert custom content UI element 330, insert preset content UI element 332, and insert records UI element 334, respectively.

For example, the desktop collaborative application 110 may be configured to provide one or more UI elements that allow a user to select and insert custom content (e.g., one or more images, videos, etc.) that are typically stored on the user's computing device 102-1, in response to a user selecting the insert custom content UI element 430. The desktop collaborative application 110 may then send the selected custom content in a collaborative communications message to the at least one target user as similarly discussed with respect to the mobile collaborative application 112.

In another example, the desktop collaborative application 110 may also be configured to provide one or more UI elements that allow a user to select and insert one or more references to a predetermined set of static and/or animated visual content that may be cached on the devices of various users (e.g., mobile device 102-1, computing device 104-1, etc.), in response to a user selecting the insert preset content UI element 432. The desktop collaborative application 110 may then send the selected preset content in a collaborative communications message to the at least one target user as similarly discussed with respect to the mobile collaborative application 112.

In a further example, the desktop collaborative application 110 may be further configured to provide one or more UI elements that allow a user to search and select various database records stored in records datastores (not shown) operatively coupled to the collaborative management application 140, in response to a user selecting the insert records UI element 434. The desktop collaborative application 110 may then send the selected database record in a collaborative communications message to the at least one target user as similarly discussed with respect to the mobile collaborative application 112.

In one embodiment, the chat UI view 402 may still further include, without limitation, message input UI element 420, which may be similarly configured as message input UI element 320. For example, like message input UI element 320, the message input UI element 420 may be configured to visually present, in real time, the various user inputs (e.g., alphanumeric input, etc.) the user may provide via an input device (e.g., a keyboard, onscreen assistive input, etc.) operatively coupled to the computing device 104-1. Additionally, the message input UI element 420 may also be configured to visually present one or more selected collaborative document UI elements as further discussed with respect to at least FIGS. 6A-6C.

In one embodiment, the chat UI view 402 may still further include, without limitation, a send message UI element 418, which may be similarly configured as send message UI element 318. For example, like send message UI element 318, the send message UI element 418 may be a selectable UI element to allow a user of the computing device 104-1 to request the computing device 104-1 to generate a message transmission request including the collaborative communications message, and send the message transmission request as discussed with respect to at least FIGS. 6A-6C.

It can be appreciated that while the chat UI view 402 does not include an input token UI element (e.g., input token UI element 322) like that of chat UI view 300 of FIG. 3, a user may nonetheless provide an input token (e.g., "@" etc.) via an input device (e.g., a keyboard, onscreen assistive input, etc.) operatively coupled operatively coupled to the computing device 104-1. The provided input token may be configured or otherwise operate similarly to the input token UI element 322 of chat UI view 3000 of FIG. 3.

Figure 5C:
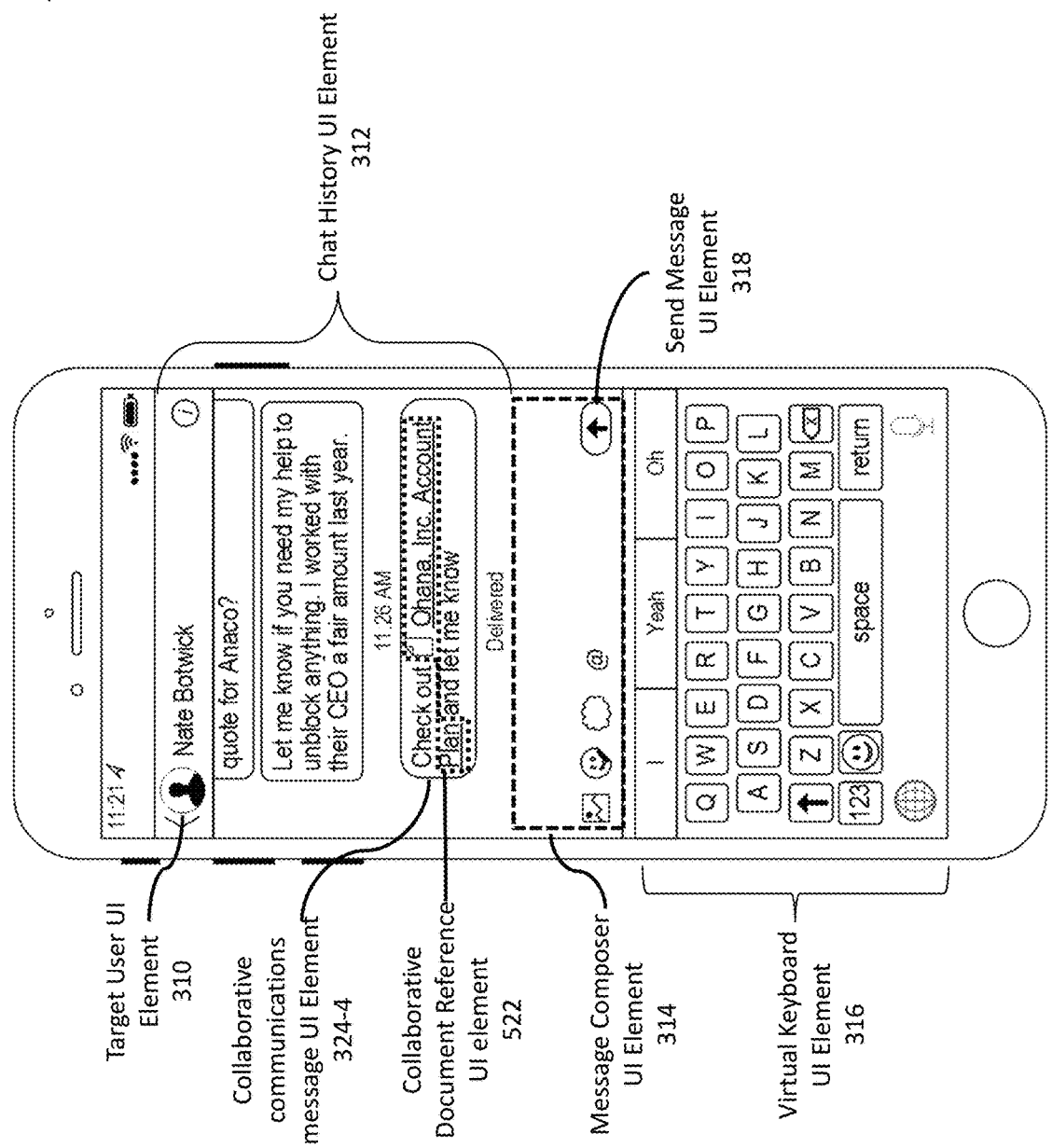

FIGS. 5A-5C illustrate an example sequence of chat UI view 500 visually presented by the mobile collaborative application 112 on a display device of the mobile device 102-1 for selecting and sending a collaborative communications message that may include, without limitation, a collaborative document reference.

As illustrated in FIG. 5A, a user may use the virtual keyboard UI element 316 to input one or more alphanumeric characters (e.g., "Check out," etc.), which may be visually presented in the message composer UI element 314 and more specifically, message input UI element 320. Additionally, as illustrated in FIG. 5A, the user may also use the virtual keyboard UI element 316 and/or input token UI element 322 to input an input token 516.

In one embodiment, and as illustrated in FIG. 5A, the user may input an input token (e.g., "@" etc.) to request an insertion of collaborative content, such as, for example, one or more collaborative document. In response, the mobile collaborative application 112 may visually present the collaborative document selection UI element 512 that may include one or more collaborative document option UI elements 514-d (e.g., collaborative document option UI elements 514-1, 514-2, 514-3, etc.). Additionally, while the collaborative document selection UI element 512 may be configured to visually present a set number of collaborative document option UI elements (e.g., three, four, five, etc.) at one time, the document selection UI element 512 may also be scrollable in order to allow a user to view additional collaborative document option UI elements 514-d.

In one embodiment, each of the one or more collaborative document option UI elements 514-*d* may correspond to cached collaborative document information for a collaborative document that the user of the mobile collaborative application 112 is authorized to access. Stated differently, each collaborative document option UI elements may correspond to cached collaborative document information within the cached authorized collaborative document list. Thus, each of the one or more collaborative document option UI elements 514-*d* may also visually present at least a portion of the cached collaborative document information for each collaborative document (e.g., collaborative document pictogram identifier, collaborative document type, collaborative document title, etc.)

For example, as shown in FIG. 5A, each collaborative document option UI elements 514-1, 514-2, 514-3 are configured to visually present at least a portion of the cached collaborative document information, which may include, without limitation, the collaborative document pictogram identifier as a pictogram (e.g., icon, etc.) that represents the general document type (e.g., word processor document, etc.). Additionally, each of the collaborative document option UI elements 514-1, 514-2, 514-3 may also be configured to visually present a collaborative document title (e.g., "Ohana Deployment Plan," "Ohana, Inc. Account Plan," "Ohana Mutual Success Plan," etc.). The Example are not limited in this context.

In one embodiment, each of the one or more collaborative document option UI elements 514-*d* may also be selectable by the user of the mobile collaborative application 112 to send to a target user as visually presented by target user UI element 310. The selected collaborative document UI element 520 may then be visually presented in the message composer UI element 314 may then be sent to the target user as further illustrated with respect to FIG. 5B.

In one embodiment, each of the one or more collaborative document option UI elements 514-*d* as visually presented in the collaborative document selection UI element 512 may also be ranked based at least on collaborative document access frequency associated with each of the one or more collaborative document option UI elements 514-*d*. For example, collaborative document option UI elements 514-*d* corresponding to collaborative documents that are frequently accessed by the user may be ranked and visually presented first in the collaborative document selection UI element 512 while those that are infrequently accessed are ranked last and thus, visually presented last.

Additionally or alternatively, the ranking of the collaborative document option UI elements 514-*d* may be configured based at least on the collaborative document access frequency for each of the one or more collaborative document option UI elements 514-*d* and a time decay window specifying a time period that the collaborative document access frequency should be considered. For example, collaborative document option UI elements 514-*d* corresponding to collaborative documents that have been most frequently accessed within a time decay window (e.g., within the last week, within last month, etc.) may be ranked and visually presented first in the collaborative document selection UI element 512. Thus, as time progresses, the collaborative document access frequency for one or more collaborative documents may decrease if they have not been accessed within the time decay window. Consequently, the ranking of these documents may also decrease.

In one embodiment, after the user inputs an input token (e.g., "@," etc.) to request an insertion of collaborative content, subsequent alphanumeric input received from a user may further filter the collaborative document option UI elements 514-*d*. For example, subsequent alphanumeric text input (e.g., "ohana"), which may be visually presented proximate and after the input token 516 (e.g., "@"), may filter out or remove zero or more the collaborative document option UI elements 514-*d* that do not have collaborative documents with a collaborative document title that at least partially match the subsequent alphanumeric text input. The filtering may be applied with each subsequent alphanumeric text input while the collaborative document selection UI element 512 remains visually presented. Additionally, the filtered collaborative document option UI elements 514-*d* may also be further ranked as previously discussed above.

Additionally or alternatively, in some implementations, the mobile collaborative application 112 may visually present the collaborative document selection UI element 512 in response to receiving both the input token and the at least one additional alphanumeric input. In these implementations, the mobile collaborative application 112 may use the at least one alphanumeric input to filter the collaborative document option UI elements 514-*d* as discussed herein.

As illustrated in FIG. 5B, after a user selects a particular collaborative document option UI elements 514-*d*, a selected collaborative document UI element 520 may be visually presented in the message composer UI element 314 and more specifically, the message input UI element 320. In on embodiment, the selected collaborative document UI element 520 may visually present at least a portion of the cached collaborative document information for the selected collaborative document (e.g., collaborative document type, collaborative document title, etc.). Additionally, the user may further provide additional alphanumeric text input (e.g., "let me know", etc.) along with the selected collaborative document UI element 520.

As illustrated in FIG. 5C, after the user selects the send message UI element 318 to send the collaborative document reference corresponding to the selected collaborative document UI element 520 and the associated text, the collaborative communication message may be visually presented as collaborative communications message UI element 324-4. The collaborative communications message UI element 324-4 may include, without limitation, the collaborative document reference UI element 522, accompanying alphanumeric text (e.g., "Check out . . . and let me know"), and/or any or collaborative content. The collaborative document reference UI element 522 may correspond to the collaborative document reference for the collaborative document (e.g., "Ohana, Inc. Account Plan").

In one example implementation of the collaborative communication message, the alphanumeric text may be encoded using one or more descriptive languages (e.g., HTML or subset thereof, etc.). Additionally, the collaborative document reference for the collaborative document may be encoded as a collaborative document address such as, for example, URI/URL. However, it can be appreciated that the collaborative document address may be not visually presented depending on the implementation. Thus, as illustrated in FIG. 5C, in some embodiments, the collaborative communications message UI element 324-4 may be configured to visually present at least a pictogram and the collaborative document title associated with collaborative document reference.

While not illustrated, it can be appreciated that the user of the mobile collaborative application 112 may select collaborative document reference UI element 522 having a corresponding collaborative document reference. In response to the selection, the mobile collaborative application 112 may then request the collaborative management system 126 to provide the collaborative document corresponding to the collaborative document reference to the mobile collaborative application 112. Alternatively, in response to the selection, the mobile collaborative application 112 may request to execute or open a separate mobile application (not shown) configured to manage (e.g., open, update, revise, modify, delete, etc.) collaborative documents stored in document datastores 134. The separate mobile application may then request the collaborative management system 126 to provide the collaborative document corresponding to the collaborative document reference to the separate mobile application for management (e.g., open, update, revise, modify, delete, etc.).

FIGS. 6A-6C illustrate an example sequence of desktop collaborative application UI view 600 visually presented by the desktop collaborative application 112 on a display device coupled to computing device 104-1 for selecting and sending a collaborative communications message that includes a collaborative document reference. It can be appreciated that functionalities and operations associated with the chat UI view 402 of the desktop collaborative application 110 as discussed herein may be similar to the example sequence of chat UI view 500 visually presented by the mobile collaborative application 112 as discussed with FIGS. 5A-5C. Thus, the following discussions of FIGS. 6A-6C are primarily directed to one or more differences from the desktop collaborative application 110 with respect to the mobile collaborative application 112.

As illustrated in FIG. 6A and as similarly discussed with FIG. 5A, a user may use input one or more alphanumeric characters (e.g., "Check out," etc.), which may be visually presented in the message composer UI element 414 and more specifically, message input UI element 420. Additionally, the user may also input an input token 616 via an input device (e.g., a keyboard, onscreen assistive input, etc.) operatively coupled to computing device 104-1.

In one embodiment, and as similarly discussed with 5A, the user may input an input token (e.g., "@" etc.) to request an insertion of collaborative content, such as, for example, one or more collaborative documents. In response, the desktop collaborative application 110 may visually present the collaborative document selection UI element 612, which may be scrollable and may include one or more collaborative document option UI elements 614-*d* (e.g., collaborative document option UI elements 614-1, 614-2, 614-3, etc.).

In one embodiment, and as similarly discussed with FIG. 5A, each of the one or more collaborative document option UI elements 614-*d* may correspond to cached collaborative document information for a collaborative document that the user of the desktop collaborative application 110 is authorized to access.

Additionally, as illustrated in FIG. 6A, each of the one or more collaborative document option UI elements 614-*d* may also be configured to visually present at least a portion of the collaborative document access control list of the cached collaborative document information for each collaborative document that the user is authorized to access. Thus, each of the one or more collaborative document option UI elements 614-*d* may also visually present at least a portion of a user full name (e.g., first name only, last name only, first and last name, etc.) of each of the other users who may also have access to the same collaborative document.

In one embodiment, as similarly discussed with FIG. 5A, each of the one or more collaborative document option UI elements 614-*d* may also be selectable by the user of the desktop collaborative application 110 to send to a target user as visually presented by target user UI element 410. The selected collaborative document UI element 620 may then be visually presented in the message composer UI element 414 may then be sent to the target user as further illustrated with respect to FIG. 6B.

In one embodiment and as similarly discussed with FIG. 5A, each of the one or more collaborative document option UI elements 614-*d* as visually presented in the collaborative document selection UI element 612 may also be ranked based at least on collaborative document access frequency and/or time decay window associated with each of the one or more collaborative document option UI elements 614-*d*.

In one embodiment and as similarly discussed with FIG. 5A, after the user inputs an input token (e.g., "@" etc.) to request an insertion of collaborative content, subsequent alphanumeric input received from a user may further filter the collaborative document option UI elements 614-*d*.

As illustrated in FIG. 6B and similarly discussed with FIG. 5B, after a user selects a particular collaborative document option UI elements 614-*d*, a selected collaborative document UI element 620 may be visually presented in the message composer UI element 414 and more specifically, message input UI element 320. In on embodiment, selected collaborative document UI element 520 may visually present at least a portion of the cached collaborative document information for the selected collaborative document (e.g., collaborative document type, collaborative document title, etc.). Additionally, the user may further provide additional alphanumeric text input (e.g., "let me know", etc.)

As illustrated in FIG. 6C and similarly discussed with FIG. 5C, after a user selects the send message UI element 418 to send the collaborative document reference corresponding to the selected collaborative document UI element 620 and the associated text, the collaborative communication message may be visually presented as collaborative communications message UI element 624. The collaborative communications message UI element 624 may include, without limitation, the collaborative document reference UI element 622, alphanumeric text (e.g., "Check out . . . and let me know"), and/or any or collaborative content. The collaborative document reference UI element 622 may correspond to the collaborative document reference for the collaborative document (e.g., "Ohana, Inc. Account Plan")

As similarly discussed with FIG. 5C, the alphanumeric text may be encoded using one or more descriptive languages and the collaborative document reference for the collaborative document may be encoded as a collaborative document address such as, for example, as an URI/URL. However, it can be appreciated that the collaborative document address may be not visually presented depending on the implementation. Thus, as illustrated in FIG. 6C, in some embodiments, the collaborative document reference UI element 622 may be configured to visually present a pictogram and the collaborative document title associated with collaborative document reference.

It can be appreciated that while only a single chat UI view 402 is illustrated and discussed with respect to FIGS. 6A-6C, one or more additional chat UI views may be visually presented by the desktop collaborative application 110. For example, when the user of the desktop collaborative application 110 initiates chat individually with more than one target user, the desktop collaborative application 110 may visually present two or more chat UI views 402, where each chat UI view 402 may be directed to a real-time messaging for a specific target user. Each chat UI view 402 may also be similarly configured and shown as discussed in at least FIGS. 6A-6C.

Figure 7A:
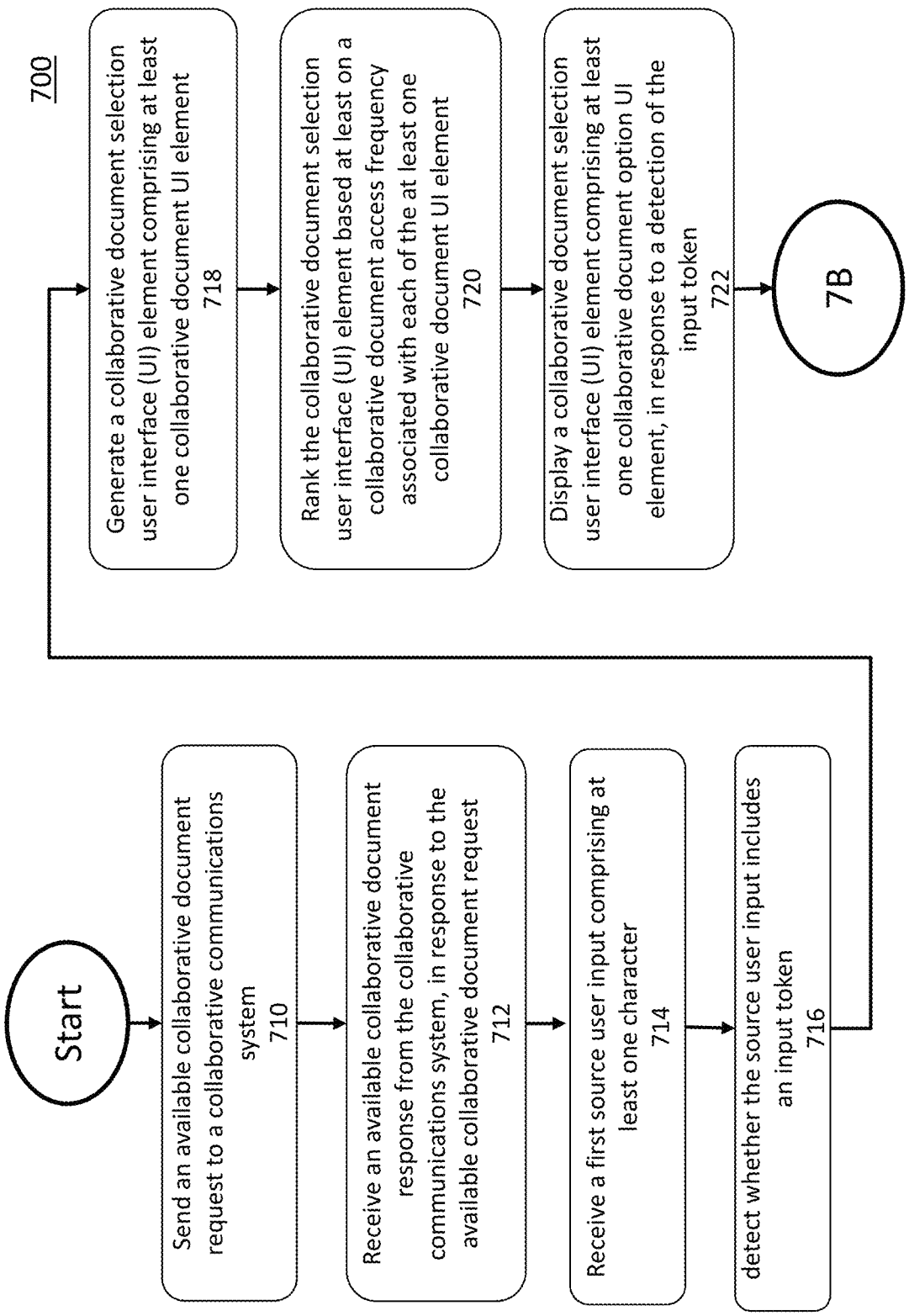
FIGS. 7A-7C illustrate an example logic flow 700 for sending a collaborative document reference from a source user to at least one target user via a collaborative communications system.
Figure 7B:
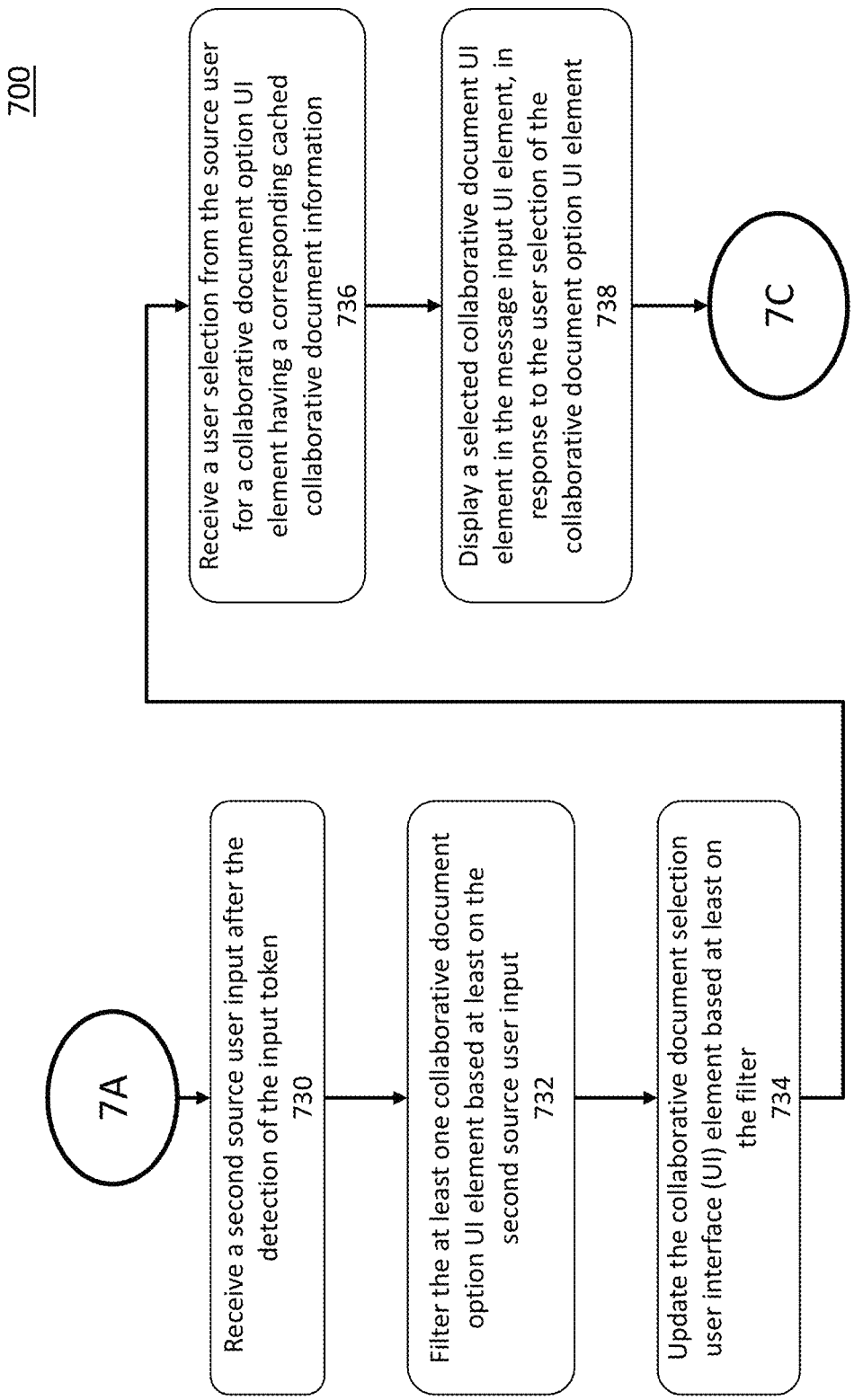
Figure 7C:
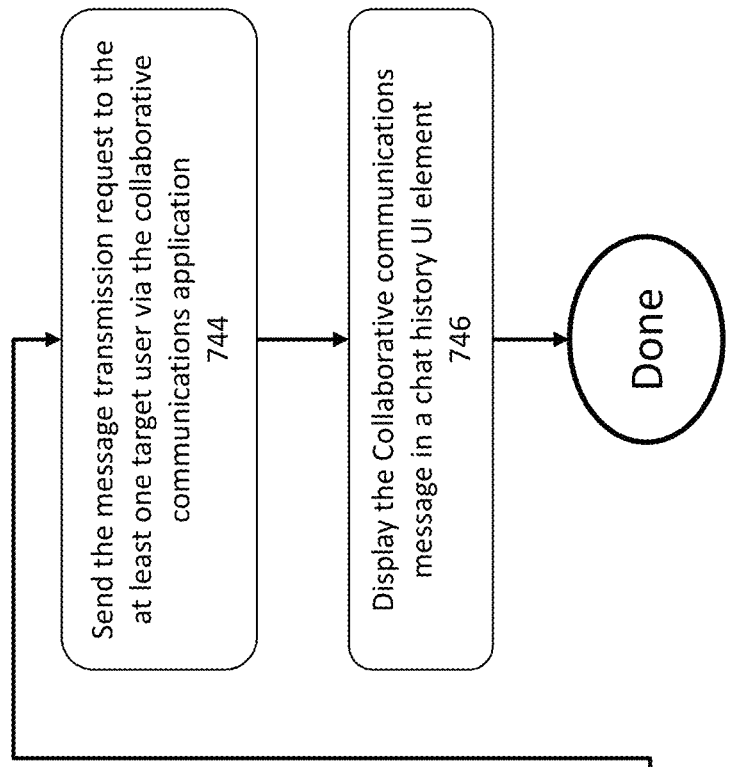
Figure 7C:
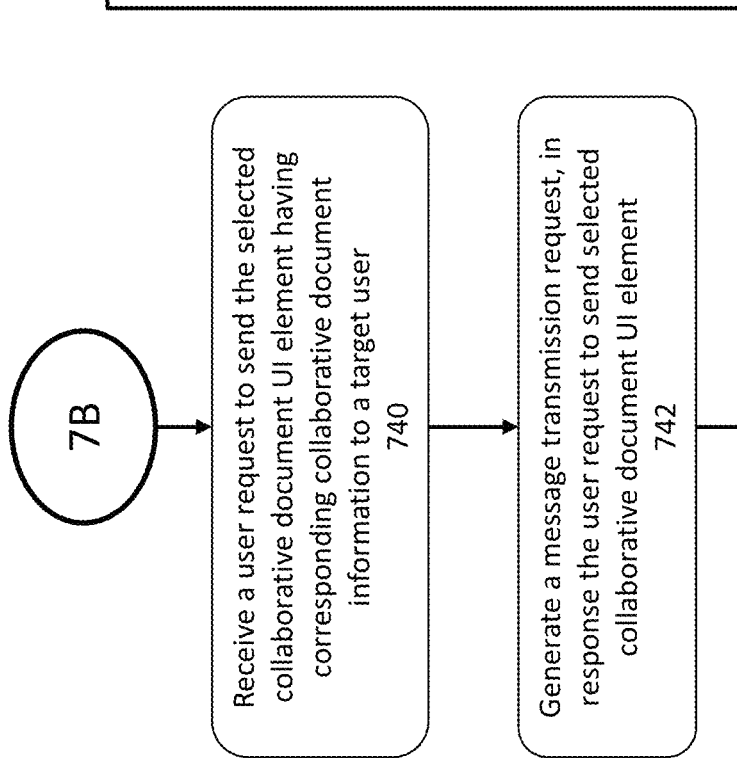

FIGS. 7A-7C illustrate an example logic flow 700 for sending a collaborative document reference from a source user to at least one target user via a collaborative communications system. It is to be appreciated that depending on implementation, not all stages need to be performed. Nor do all stages need to be performed in the order as illustrated. Additionally, one or more stages may be combined with other disclosures as discussed herein.

As illustrated in FIG. 7A the logic flow may begin at stage 710, where a collaborative application (e.g., desktop collaborative application 110, mobile collaborative application 112, etc.) may send an available collaborative document request to a collaborative communications system 128 (e.g., collaborative communications application 142, etc.) in response to a source user's (e.g., a user of the mobile collaborative application 112, a user of the desktop collaborative application 110, etc.) request to initiate a real-time instant messaging session with the at least one target user.

At stage 712, the collaborative application may receive an available collaborative document response from the collaborative communications system 128, in response to the available collaborative document request. The available collaborative document response may include, without limitation, cached authorized collaborative document list identifying at least one collaborative document the source user may access.

At stage 714, the collaborative application may receive a first source user input comprising at least one character (e.g., at least one alphanumeric character, etc.) from the source user. The first source user input may form at least a portion of a collaborative communication message to be transmitted to the at least one target user.

At stage 716, the collaborative application may detect whether the first source user input includes an input token (e.g., "@", etc.), where the input token may indicate a request by the source user to insert collaborative content to be sent to the at least one target user. The collaborative content may include, without limitation, a collaborative document reference into the collaborative communications message.

At stage 718, the collaborative application may generate a collaborative document selection UI element comprising at least one collaborative document option UI element based at least on cached authorized collaborative document list. Each collaborative document option UI element of the collaborative document selection UI element may correspond to cached collaborative document information for a collaborative document that the source user is authorized to access.

At stage 720, the collaborative application may rank the at least one collaborative document option UI element based at least on a collaborative document access frequency associated with each of the at least one collaborative document option UI element.

At stage 722, the collaborative application may display the collaborative document selection UI element comprising the at least one collaborative document option UI element, in response to at least a detection of the input token.

As illustrated in FIG. 7B the logic flow may continue at stage 730, where the collaborative application may receive a second or additional source user input after the detection of the input token. The second source user input may include, without limitation, one or more alphanumeric characters.

At stage 732, the collaborative application may filter out zero or more collaborative document option UI elements of the collaborative document selection UI element, in response to detecting the second or additional user input received after the input token. Moreover, the filter operation may remove zero or more collaborative document option UI elements from the collaborative document selection UI element based at least on the one or more one or more alphanumeric characters of the second or additional source user input and at least the collaborative document title associated with each collaborative document option UI element.

At stage 734, the collaborative application may update the collaborative document selection UI element based at least on the filter operation. It can be appreciated that stages 732 and 734 may be repeated for each additional user input while the collaborative document selection UI element remains visually presented so that further user inputs may be used to further filter out zero or more document option UI elements that do not at least partially match the additional user inputs.

At stage 736, the collaborative application may receive a user selection from the source user for a collaborative document option UI element having corresponding collaborative document information.

At stage 738, the collaborative application may display a selected collaborative document UI element in the message input UI element, in response to the user selection of the collaborative document option UI element. The selected collaborative document UI element may correspond to the collaborative document option UI element selected by the source user.

As illustrated in FIG. 7C, the logic flow may continue at stage 740, where the collaborative application may receive a user request to send the selected collaborative document UI element having corresponding collaborative document information to the at least one target user.

At stage 740, the collaborative application may generate a message transmission request, in response the user request to send selected collaborative document UI element. The message transmission request may include, without limitation, the collaborative communications message. The collaborative communications message may include, without limitation, the collaborative document reference.

At stage 744, the collaborative application may send the message transmission request to the at least one target user via the collaborative communications application 142.

At stage 746, the collaborative application may display the collaborative communication message in a chat history UI element on a display coupled to a mobile device or a computing device and the logic flow may end.

Figure 8:
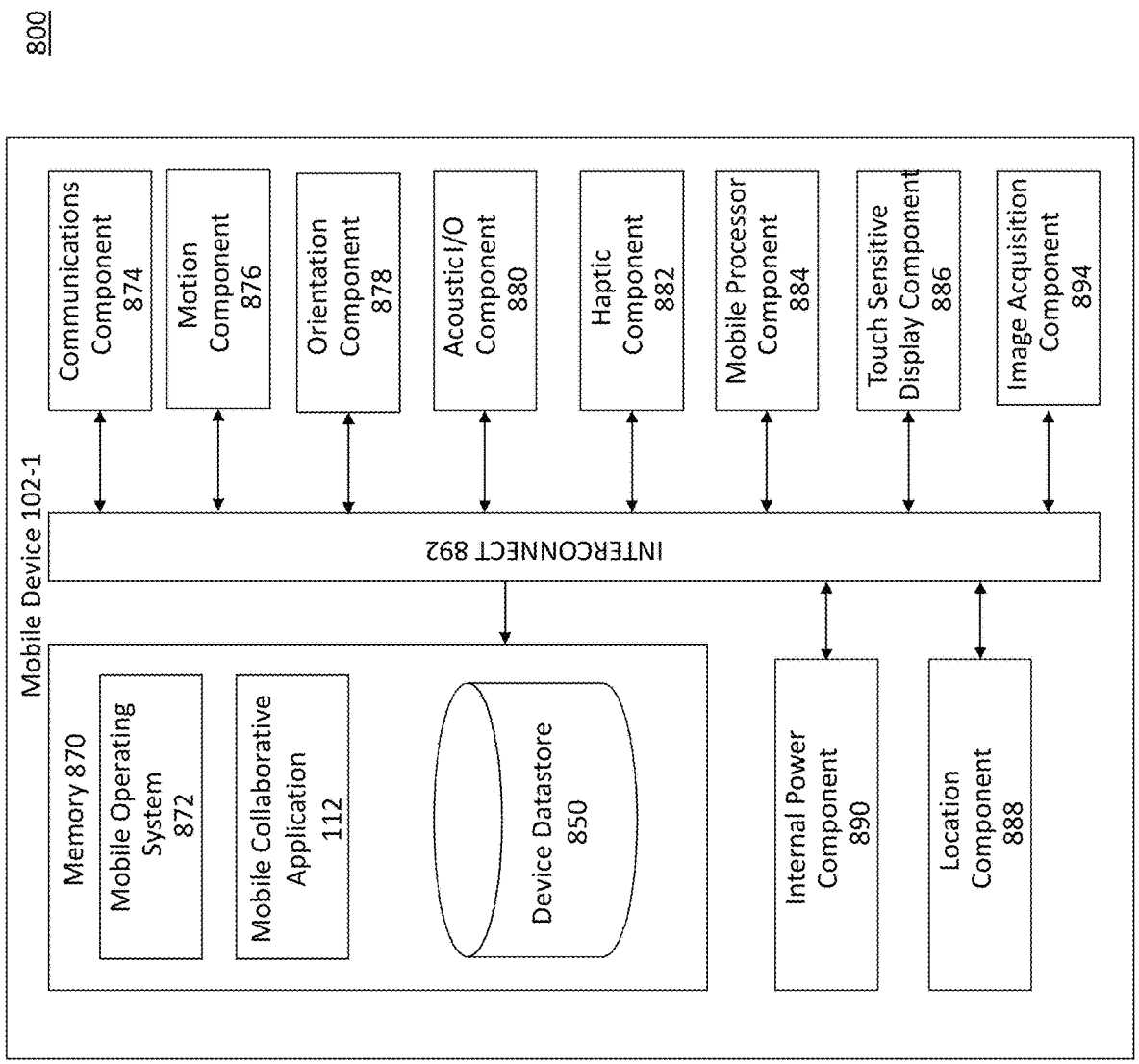
FIG. 8 illustrates and example mobile device configured to execute the mobile collaborative application.

FIG. 8 illustrates an example block diagram 800 of an example embodiment of the mobile device 102 executing a mobile collaborative application 112. The mobile device 102 (e.g., a mobile phone, tablet, laptop, etc.) may be generally configured to enable or allow a user to access various collaborative content and engage in real-time instant messaging of one or more target users. It is to be appreciated that while FIG. 8 illustrates one example embodiment of the mobile device 102, the example embodiment is not limited to this context.

In one embodiment, the mobile device 102 may be generally arranged to provide mobile computing and/or mobile communications and may include, but are not limited to, memory 870, communications component 874, motion component 876, and orientation component 878, acoustic input/output component 880, haptic component 882, mobile processor component 884, touch sensitive display component 886, location component 888, internal power component 890, and image acquisition component 894, where each of the components and memory 870 may be operatively connected via interconnect 892.

In one embodiment, the memory 870 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

In one embodiment, the memory 870 may include instruction information arranged for execution by the mobile processor component 884. In that embodiment, the instruction information may be representative of at least one operating system 872, one or more applications, which may include, but are not limited to, mobile collaborative application 112. In an embodiment, the memory 970 may further include device datastore 950 which may be configured to store information associated with the mobile collaborative application 112 (e.g., cached authorized collaborative document list, cached chat history, etc.).

In one embodiment, the mobile operating system 872 may include, without limitation, mobile operating systems (e.g., Apple®, iOS®, Google® Android®, Microsoft® Windows Phone®, Microsoft® Windows®, etc.) generally arranged to manage hardware resources (e.g., one or more components of the mobile device 102, etc.) and/or software resources (e.g., one or more applications of the mobile device 102, etc.).

In one embodiment, the communications component 874 may be generally arranged to enable the mobile device 102 to communicate, directly and/or indirectly, with various devices and systems (e.g., collaborative communications system 128, etc.). The communications component 874 may include, among other elements, a radio frequency circuit (not shown) configured for encoding and/or decoding information and receiving and/or transmitting the encoded information as radio signals in frequencies consistent with the one or more wireless communications standards (e.g., Bluetooth, Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In one embodiment, the motion component 876 may be generally arranged to detect motion of the mobile device 102 in one or more axes. The motion component 876 may include, among other elements, motion sensor (e.g., accelerometer, micro gyroscope, etc.) to convert physical motions applied to or exerted on the mobile device 102 into motion information.

In one embodiment, the orientation component 878 may be generally arranged to detect magnetic fields for measuring the strength of magnetic fields surrounding the mobile device 102. The orientation component 878 may include, among other elements, magnetic sensor (e.g., magnetometer, magnetoresistive permalloy sensor, etc.) to convert magnetic field applied to or exerted on the mobile device 102 into orientation information, which may identify a number of degrees from a reference orientation the mobile device 102 is oriented or otherwise pointed.

In one embodiment, the acoustic input/output (I/O) component 880 may be generally arranged for converting sound, vibrations, or any other mechanical waves received by the mobile device 102 into digital or electronic signals representative of acoustic input information utilizing one or more acoustic sensors (e.g., microphones, etc.), which may be located or positioned on or within the housing, case, or enclosure of the mobile device 102 to form a microphone array. Additionally, the acoustic I/O component 880 may be further arranged to receive acoustic output information and convert the received acoustic output information into electronic signals to output sound, vibrations, or any other mechanical waves utilizing the one or more electroacoustic transducers (e.g., speakers, etc.) which may be located or positioned on or within the housing, case, or enclosure of the mobile device 102. Additionally, or alternatively, the acoustic output information and/or the covered electronic signals may be provided to one or more electroacoustic transducers (e.g., speakers, etc.) operatively coupled to the mobile device 102 via wired and/or wireless connections.

In one embodiment, the haptic component 882 may be generally arranged to provide tactile feedback with varying strength and/or frequency with respect to time through the housing, case, or enclosure of the mobile device 102. Moreover, the haptic component 882 may include, among other elements, a vibration circuit (e.g., an oscillating motor, vibrating motor, etc.) arranged to receive haptic output information and convert the received haptic output information to mechanical vibrations representative of tactile feedback.

In one embodiment, the mobile processor component 884 may be generally arranged to execute instruction information, which may generally including one or more executable and/or interpretable instructions. In an embodiment, the processor component 884 may be a mobile processor component or system-on-chip (SoC) processor component. The processor component 884, may comprise, among other elements, processor circuit, which may further include, but is not limited to, at least one set of electronic circuits arranged to execute one or more instructions. Examples of mobile processor components 884 may include, but is not limited to, Qualcomm® Snapdragon®, NVidia® Tegra®, Intel® Atom®, Samsung® Exynos, Apple® A7®-A13®, or any other type of mobile processor(s) arranged to execute the instruction information including the one or more instructions stored in memory 870.

In one embodiment, the touch sensitive display component 886 may be generally arranged to receive and present visual display information, and provide touch input information based on detected touch based or contact based input. Moreover, the touch sensitive display component 286 may include, among other elements, display device (e.g., liquid-crystal display, light-emitting diode display, organic light-emitting diode display, etc.) for presenting the visual display information and touch sensor(s) (e.g., resistive touch sensor, capacitive touch sensor, etc.) associated with the display device 268 to detect and/or receive touch or contact based input information associated with the display device of the mobile device 102. Additionally, the touch sensor(s) may be integrated with the surface of the display device, so that a user's touch or contact input may substantially correspond to the presented visual display information on the display device, such as, for example, one or more user interface (UI) views and elements discussed and illustrated herein.

In one embodiment, the location component 888 may be generally arranged to receive positioning signals representative of positioning information and provide location information (e.g., approximate physical location of the mobile device 102) determined based at least partially on the received positioning information. Moreover, the location component 888 may include, among other elements, positioning circuit (e.g., a global positioning system (GPS) receiver, etc.) arranged to determine the physical location of the mobile device 102. In some embodiments, the location component 888 may be further arranged to communicate and/or interface with the communications component 874 in order to provide greater accuracy and/or faster determination of the location information.

In one embodiment, the internal power component 890 may be generally arranged to provide power to the various components and the memory of the mobile device 102. In one embodiment, the internal power component 890 may include and/or be operatively coupled to an internal and/or external battery configured to provide power to the various components (e.g., communications component 874, motion component 876, memory 870, etc.). The internal power component 890 may also be operatively coupled to an external charger to charge the battery.

In one embodiment, the image acquisition component 894 may be generally arranged to generate a digital image information using an image capture device such as, for example, a charged coupled device (CCD) image sensor (Not shown). Moreover, the image acquisition component 894 may be arranged to provide or otherwise stream digital image information captured by a CCD image sensor to the touch sensitive display component 886 for visual presentation via the interconnect 892, the mobile operating system 872, mobile processor component 884.

Figure 9:
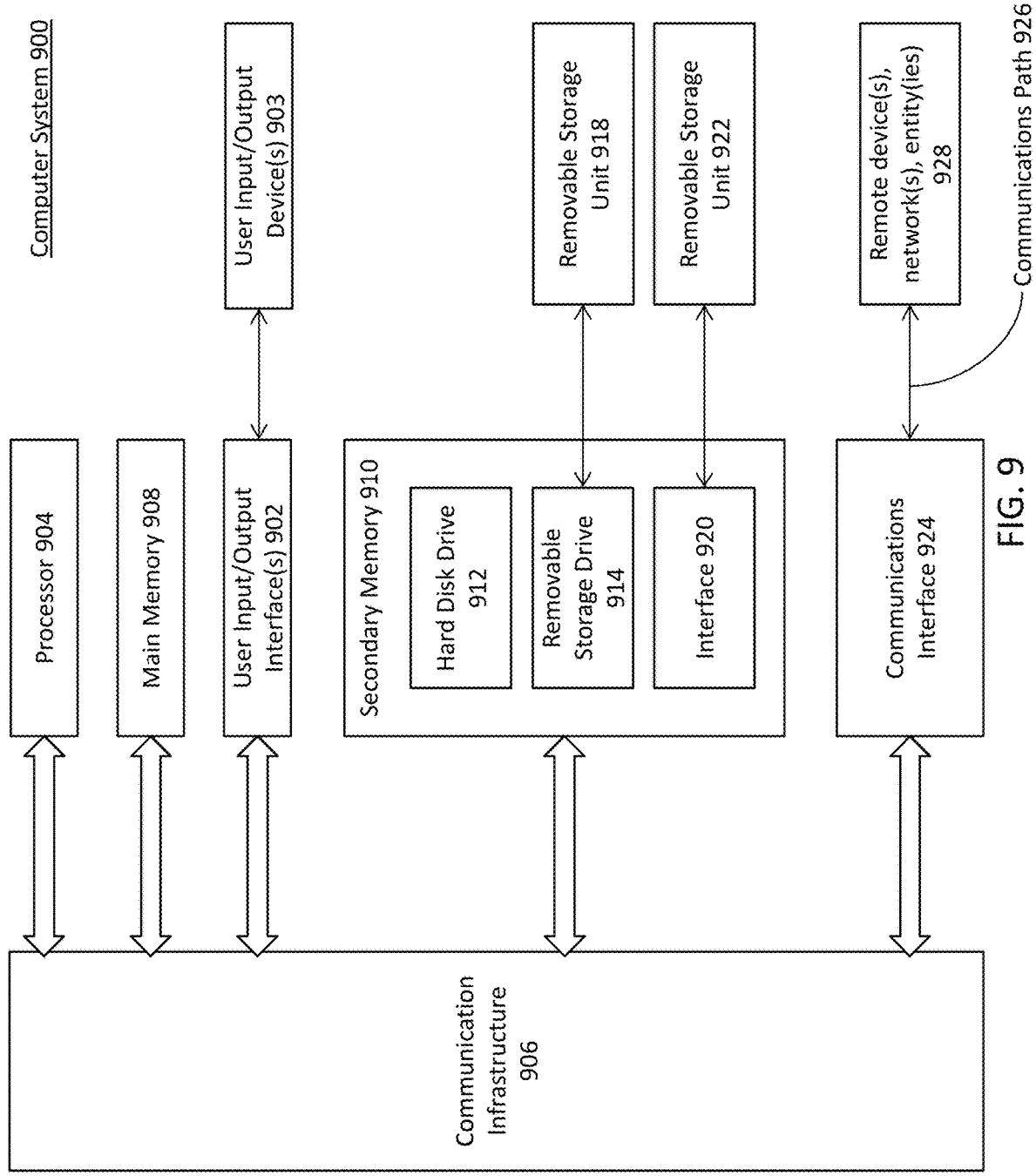
FIG. 9 illustrates an example computer system useful for implementing various embodiments.

FIG. 9 illustrates an example computer system 900 useful for implementing various embodiments. Moreover, various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof. For example, the computer system 900 may implement the one or more computing devices 104-a. In another example, one or more computing systems 900 may be communicatively coupled to each other, where each is configured to execute one or more virtual machines (not shown). The one or more virtual machines may be managed or otherwise orchestrated by one or more virtual machine managers (not shown) configured to provision and/or configure one or more virtual machines to the one or more computing systems 900. The one or more virtual machines may be further configured as a Software as a Service (SaaS), Platform as a Service (PaaS) and/or an Infrastructure as a Service (IaaS) provider configured to host or otherwise execute one or more applications associated with one or more gateways, systems, and/or datastores of FIG. 1.

Computer system 900 may include one or more processors (also called central processing units, or CPUs), such as a processor 904. Processor 904 may be connected to a communication infrastructure or bus 906.

Computer system 900 may also include customer input/output device(s) 903, such as monitors, keyboards, pointing devices, etc., which may communicate with communication infrastructure 906 through customer input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A mobile device, comprising:
a touch sensitive display configured to display at least one user interface (UI) of a mobile collaborative application;
at least one processor operatively coupled to the touch sensitive display; and
a memory operatively coupled to the at least one processor, wherein the at least one processor is configured to perform operations comprising:
displaying, on the touch sensitive display, the at least one UI, wherein the at least one UI includes a virtual toolbar with a plurality of displayed options, a message input region, a virtual keyboard, and a chat history region;
displaying, on the touch sensitive display in response to at least detecting a user input comprising an input token and a text input, and corresponding to the plurality of displayed options, one or more collaborative document options identified using the text input, wherein:
the text input is associated with a first displayed option of the plurality of displayed options;
each of the one or more collaborative document options corresponds to a respective collaborative document stored external to the mobile device; and
each of the one or more collaborative document options includes at least a portion of an access control list associated with the respective collaborative document for display;
displaying, on the touch sensitive display in response to a selection of a collaborative document option out of the one or more collaborative document options, a representation of the selected collaborative document option in the message input region;
generating a message transmission request, wherein the message transmission request includes a source user identifier identifying a source user associated with the user input and the mobile device, and a target user identifier identifying a target user targeted by the text input;
adding the target user identifier to the access control list for the collaborative document corresponding to the selected collaborative document option in response to a document access being associated with the source user identifier while no document access is associated with the target user identifier to the collaborative document; and displaying, on the touch sensitive display, a representation of the selected collaborative document option in the chat history region after sending a message based at least on the selected collaborative document option to the target user according to the message transmission request, wherein the representation of the selected collaborative document option includes a collaborative document title, and a collaborative document pictogram associated with the selected collaborative document option.

2. The mobile device of claim 1, wherein the processor is further configured to perform the operations comprising:

displaying, on the touch sensitive display, the input token in the message input region of the mobile collaborative application, upon a determination that the user input corresponds to the first displayed option of the plurality of displayed options; and displaying, on the touch sensitive display, one or more characters in the message input region in response to receiving the text input via the virtual keyboard, wherein the one or more characters are displayed proximate to the input token, and wherein the operations for the displaying of the input token, the displaying of the one or more collaborative document options, and the displaying of the one or more characters are performed in response to at least receiving the user input corresponding to the plurality of displayed options.

3. The mobile device of claim 2, wherein the collaborative document is associated with a list of users authorized to access the collaborative document.

4. The mobile device of claim 2, wherein the processor is further configured to perform the operations comprising:

displaying a plurality of representations of animated visual content, upon a determination that the user input corresponds to a second displayed option of the plurality of displayed options and in response to receiving the user input corresponding to the plurality of displayed options.

5. The mobile device of claim 2, wherein the processor is further configured to perform operations comprising:

displaying one or more representations of records stored in an external database, upon a determination that the user input corresponds to a third displayed option of the plurality of displayed options and in response to receiving the user input corresponding to the plurality of displayed options.

6. The mobile device of claim 2, wherein the input token is displayed in the message input region in response to user selection of a particular key of the virtual keyboard, and wherein the particular key is different from the user input corresponding to the first displayed option.

7. The mobile device of claim 2, wherein the processor is further configured to perform operations comprising:

detecting a selection of the representation of the selected collaborative document option in the chat history region;

launching a separate application different from the mobile collaborative application; and displaying, by the separate application, content of the collaborative document corresponding to the selected collaborative document option, in response to detecting the selection of the representation of the selected collaborative document option.

8. A computer-implemented method, comprising:

receiving, by a mobile collaborative application, a source user input from a source user via at least one user interface (UI) element displayed on a touch sensitive display of a mobile device;

detecting, by the mobile collaborative application, whether the source user input includes an input token and a text input;

displaying, by the mobile collaborative application on the touch sensitive display, a collaborative document selection UI element comprising at least one collaborative document option UI element identified using the text input, in response to at least detecting the input token, wherein each of the at least one collaborative document option UI elements corresponds to a respective collaborative document stored external to the mobile device and includes at least a portion of an access control list associated with the respective collaborative document for display;

displaying, by the mobile collaborative application on the touch sensitive display, a selected collaborative document UI element in a message input UI element, in response to a user selection of a collaborative document option UI element having associated cached collaborative document information;

generating, by the mobile collaborative application, a message transmission request based at least on the cached collaborative document information, wherein the message transmission request includes a source user identifier identifying the source user, a target user identifier identifying a target user targeted by the text input, and a collaborative communications message comprising a collaborative document reference, wherein the collaborative document reference corresponds to a collaborative document stored in document datastores;

adding the target user identifier to the access control list for the collaborative document corresponding to the selected collaborative document option in response to a document access being associated with the source user identifier while no document access is associated with the target user identifier to the collaborative document; and displaying, by the mobile collaborative application on the touch sensitive display, the collaborative communications message as a collaborative communications message UI element in a chat history UI element after sending the message transmission request to the target user via a collaborative communications system based at least on the selected collaborative document option, wherein the displayed collaborative communications message UI element includes a collaborative document title, and a collaborative document pictogram associated with the collaborative document.

9. The computer-implemented method of claim 8, further comprising:

sending, by the mobile collaborative application in response to displaying the at least one UI, an available collaborative document request to the collaborative communications system, wherein the available collaborative document request includes the source user identifier that identifies the source user associated with the mobile device, and receiving, by the mobile collaborative application, an available collaborative document response from the collaborative communications system, in response to the source user identifier being identified in the access control list of each of the authorized collaborative documents, wherein the available collaborative document response includes a cached authorized collaborative document list that includes cached collaborative document information for each collaborative document the source user is authorized to access based on the source user identifier.

10. The computer-implemented method of claim 8, further comprising:
displaying, by the mobile collaborative application on the touch sensitive display, a chat UI view comprising the at least one UI element, wherein:
the at least one user interface (UI) element comprises a message composer UI element and the chat history UI element,
the message composer UI element comprises at least a message input UI element, and
the chat history UI element is configured to display a chat history received from the collaborative communications system.

11. The computer-implemented method of claim 10, wherein the collaborative communications system is configured to:
receive the collaborative communications message sent by the collaborative communications application,
update the chat history stored in communications datastores associated with the source user and the target user based at least on the collaborative communications message,
send a document access request to the collaborative management system to request a grant of access to the collaborative document for the target user, and
send the collaborative communications message to a target device associated with the target user.

12. The computer-implemented method of claim 8, further comprising:
generating, by the mobile collaborative application, the collaborative document selection UI element comprising the at least one collaborative document option UI element; and
ranking, by the mobile collaborative application, the at least one collaborative document option UI element based at least on a collaborative document access frequency associated with the at least one collaborative document UI element.

13. The computer-implemented method of claim 12, further comprising:
receiving, by the mobile collaborative application, the text input after detecting the input token, wherein the text input includes at least one additional character; and
filtering, by the mobile collaborative application, the at least one collaborative document option UI element based at least on the text input, in response to a detection of the text input received after the input token.

14. The computer-implemented method of claim 13, wherein:
the collaborative communications message includes a set of communications message attributes and communications message content,
the set of communications message attributes includes a communications message author attribute identifying the source user that sent the collaborative communications message, and
the collaborative document reference includes the collaborative document title associated with the collaborative document, a collaborative document identifier that uniquely identifies the collaborative document, and a collaborative document pictogram identifier associated with the collaborative document.

15. The computer-implemented method of claim 8, wherein the collaborative management system is configured to receive, from a device associated with the target user, at least one request to modify at least a portion of the collaborative document stored in at least one datastore operatively coupled to the collaborative management system.

16. The computer-implemented method of claim 8, further comprising:
receiving, by the mobile collaborative application, a user selection to insert preset content via an insert preset content UI element, wherein the user selection to insert the preset content is a request to insert a reference to an animated pictogram in a collaborative communications message.

17. A non-transitory computer readable storage device having instructions stored thereon that, upon execution by a mobile device, cause the mobile device to perform operations comprising:
displaying, on a touch sensitive display of the mobile device, at least one user interface (UI) of a mobile collaborative application, wherein the at least one UI includes a virtual toolbar with a plurality of displayed options, a message input region, a virtual keyboard, and a chat history region;
displaying, on the touch sensitive display in response to at least detecting a user input comprising an input token and a text input, and corresponding to the plurality of displayed options, one or more collaborative document options identified using the text input, wherein:
the text input is associated with a first displayed option of the plurality of displayed options;
each of the one or more collaborative document options corresponds to a respective collaborative document stored external to the mobile device; and
each of the one or more collaborative document options includes at least a portion of an access control list associated with the respective collaborative document for display;
displaying, on the touch sensitive display in response to a selection of a collaborative document option out of the one or more collaborative document options, a representation of the selected collaborative document option in the message input region;
generating a message transmission request, wherein the message transmission request includes a source user identifier identifying a source user associated with the user input and the mobile device, and a target user identifier identifying a target user targeted by the text input;
adding the target user identifier to the access control list for the collaborative document corresponding to the selected collaborative document option in response to a document access being associated with the source user identifier while no document access is associated with the target user identifier to the collaborative document; and
displaying, on the touch sensitive display, at least a representation of the selected collaborative document option in the chat history region after sending a message based at least on the selected collaborative document option to the target user according to the message transmission request, wherein the representation of the selected collaborative document option includes a collaborative document title, at least a portion of the access control list, and a collaborative document pictogram associated with the selected collaborative document option.

18. The non-transitory computer readable storage device of claim 17, wherein the instructions, upon execution by the mobile device, further cause the mobile device to perform operations comprising:
displaying, on the touch sensitive display, the input token in the message input region of the mobile collaborative application, upon a determination that the user input corresponds to the first displayed option of the plurality of displayed options; and
displaying, on the touch sensitive display, one or more characters in the message input region in response to receiving the text input via the virtual keyboard, wherein the one or more characters are displayed proximate to the input token,
wherein the operations for the displaying of the input token, the displaying of the one or more collaborative document options, and the displaying of the one or more characters are performed in response to at least receiving the user input corresponding to the plurality of displayed options.

19. The non-transitory computer readable storage device of claim 18, wherein
the collaborative document is associated with a list of users authorized to access the collaborative document, and
the target user is automatically granted authorization to access the collaborative document in response to the message being sent to the target user.

20. The non-transitory computer readable storage device of claim 18, wherein the instructions, upon execution by the mobile device, further cause the mobile device to perform operations comprising:
requesting at least a portion of content of the collaborative document corresponding to the selected collaborative document option from a collaborative management application, in response to detecting a selection of the representation of the selected collaborative document option, and
displaying, on the touch sensitive display at least a portion of the content of the collaborative document, after receiving at least a portion of the content from the collaborative management application.

* * * * *